(12) United States Patent
Ye et al.

(10) Patent No.: US 10,547,981 B2
(45) Date of Patent: Jan. 28, 2020

(54) INFORMATION PUSHING BASED ON USER LOCATION

(71) Applicant: Alibaba Group Holding Limited, George Town (KY)

(72) Inventors: Guo Ye, Hanzghou (CN); Jiaotuan Wang, Hanzghou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/221,044

(22) Filed: Dec. 14, 2018

(65) Prior Publication Data
US 2019/0141626 A1 May 9, 2019

Related U.S. Application Data

(63) Continuation of application No. PCT/CN2017/087134, filed on Jun. 5, 2017.

(30) Foreign Application Priority Data

Jun. 17, 2016 (CN) .......................... 2016 1 0438833

(51) Int. Cl.
H04W 4/029 (2018.01)
H04W 76/11 (2018.01)
(Continued)

(52) U.S. Cl.
CPC ........... *H04W 4/029* (2018.02); *G01S 5/0252* (2013.01); *H04L 67/26* (2013.01); *H04W 4/021* (2013.01);
(Continued)

(58) Field of Classification Search
CPC ..... H04W 48/20; H04W 76/11; H04W 48/14; H04W 48/16; H04W 60/04; H04W 64/00;
(Continued)

(56) References Cited

U.S. PATENT DOCUMENTS 8,233,913 B2 * 7/2012 Mendis ................. G01S 5/0252
455/414.1
8,385,943 B1 * 2/2013 Han ....................... H04W 4/043
455/456.1
(Continued)

FOREIGN PATENT DOCUMENTS

CN     102946591     2/2013
CN     103384399     11/2013
(Continued)

OTHER PUBLICATIONS

European Extended Search Report in European Patent Application No. 17812586.0, dated Apr. 29, 2019, 9 pages.
(Continued)

Primary Examiner — Inder P Mehra
(74) Attorney, Agent, or Firm — Fish & Richardson P.C.

(57) ABSTRACT

Implementations of the present specification include receiving, from a computing device, feature information of a Wi-Fi signal that is detected by the computing device, the feature information including identification information of the Wi-Fi signal; searching a database to identify one or more target objects associated with the feature information of the Wi-Fi signal, the database mapping feature information of a plurality of Wi-Fi signals to identification information of a plurality of target objects; and providing identification information of at least one target object of the one or more target objects to be displayed on the computing device.

21 Claims, 7 Drawing Sheets

(51) Int. Cl.

| | |
|---|---|
| *H04W 48/14* | (2009.01) |
| *H04W 48/16* | (2009.01) |
| *H04W 48/20* | (2009.01) |
| *H04W 60/04* | (2009.01) |
| *H04W 4/021* | (2018.01) |
| *H04W 64/00* | (2009.01) |
| *H04W 4/02* | (2018.01) |
| *H04L 29/08* | (2006.01) |
| *G01S 5/02* | (2010.01) |

(52) U.S. Cl.
CPC .......... *H04W 48/14* (2013.01); *H04W 48/16* (2013.01); *H04W 48/20* (2013.01); *H04W 60/04* (2013.01); *H04W 64/00* (2013.01); *H04W 76/11* (2018.02)

(58) Field of Classification Search
CPC ....... H04W 4/021; H04W 4/02; G01S 5/0252; H04L 67/26
USPC ...................................................... 455/435.2
See application file for complete search history.

(56) References Cited

U.S. PATENT DOCUMENTS

| | | | | |
|---|---|---|---|---|
| 2012/0040653 | A1* | 2/2012 | Mendis | G01S 5/0252 455/414.2 |
| 2013/0196691 | A1 | 8/2013 | Liang | |
| 2013/0339383 | A1* | 12/2013 | Song | G06F 16/9537 707/769 |
| 2015/0063164 | A1* | 3/2015 | Hemphill | H04L 9/0819 370/254 |
| 2016/0135118 | A1* | 5/2016 | Anikina | H04W 48/16 370/338 |
| 2016/0286532 | A1* | 9/2016 | Karabinis | H04L 9/00 |
| 2016/0316338 | A1* | 10/2016 | Li | H04W 4/80 |

FOREIGN PATENT DOCUMENTS

| | | |
|---|---|---|
| CN | 102017781 | 6/2015 |
| CN | 104822134 | 8/2015 |
| CN | 104918327 | 9/2015 |
| TW | 201427340 | 7/2014 |

OTHER PUBLICATIONS

International Search Report by the International Searching Authority issued in International Application No. PCT/CN2017/087134 dated Jul. 27, 2017; 8 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

\* cited by examiner

INFORMATION PUSHING BASED ON USER LOCATION

CROSS-REFERENCE TO RELATED APPLICATIONS

This application is a continuation of PCT Application No. PCT/CN2017/087134, filed on Jun. 5, 2017, which claims priority to Chinese Patent Application No. 201610438833.5, filed on Jun. 17, 2016, and each application is hereby incorporated by reference in its entirety.

TECHNICAL FIELD

The present application relates to the field of Internet information technologies, and in particular, to an information pushing method and a location positioning method and device.

BACKGROUND

With the rapid development of information technologies and Internet technologies, a growing number of people obtain related information by using the Internet. Generally, when obtaining the related information by using the Internet, the user can enter a target object to be searched on an Internet platform, and the Internet platform can search based on the target object entered by the user, and display information about the identified target object to the user. Therefore, the user can conveniently obtain the information about the target object.

To help the user to better obtain the information about the target object, when the Internet platform is to display the information about the target object to the user, the Internet platform can display, to the user based on current geographical location information of the user, information about a target object relatively close to the user. Firstly, the user's current geographical location information can be determined through positioning; secondly, the target object relatively close to the user is determined based on the user's current geographical location information; and finally, the information about the determined target object relatively close to the user is displayed to the user. Therefore, the user can conveniently obtain the information about the target object relatively close to the user.

Generally, when determining the target object relatively close to the user, the Internet platform can match user's geographical location information with address information of the target object, and determine the target object based on a matching result. However, the accuracy of the determined target object is relatively low as the matching accuracy is relatively low. Consequently, the information about the target object displayed to the user usually cannot satisfy an actual demand of the user, causing relatively poor user experience.

SUMMARY

Implementations of the present application provide an information pushing method and a location positioning method and device, and alleviate an existing problem that user experience is relatively poor because information about a target object displayed to a user cannot satisfy an actual demand of the user.

An implementation of the present application provides an information pushing method, including the following: obtaining feature information of a Wi-Fi signal detected by user equipment, where the feature information includes identification information of the Wi-Fi signal; searching a database for identification information of a target object corresponding to the identification information of the Wi-Fi signal, where the database includes a mapping relationship between identification information of a Wi-Fi signal and identification information of a target object covered by the Wi-Fi signal; and pushing the identified identification information of the target object to the user equipment.

An implementation of the present application provides an information pushing device, including the following: an acquisition unit, configured to obtain feature information of a Wi-Fi signal detected by user equipment, where the feature information includes identification information of the Wi-Fi signal; a search unit, configured to search a database for identification information of a target object corresponding to the identification information of the Wi-Fi signal, where the database includes a mapping relationship between identification information of a Wi-Fi signal and identification information of a target object covered by the Wi-Fi signal; and a pushing unit, configured to push the identification information of the target object identified by the search unit to the user equipment.

At least one of the previously described technical solutions adopted in the implementations of the present application can achieve the following beneficial effects:

In the technical solutions provided in the implementations of the present application, the identification information of the target object covered by the Wi-Fi signal is determined based on the feature information of the Wi-Fi signal that can be currently detected by the user equipment, and the determined identification information of the target object is pushed to the user equipment, so that the user of the user equipment can quickly obtain the identification information of the target object. In addition, because coverage of the Wi-Fi signal is relatively small, the accuracy of the target object determined based on the Wi-Fi signal is relatively high, and information about the target object displayed to the user can satisfy an actual demand of the user, thereby effectively improving user experience.

An implementation of the present application provides a location positioning method, including the following: obtaining feature information of a Wi-Fi signal detected by user equipment, where the feature information includes identification information of the Wi-Fi signal; searching a database for identification information of a target object corresponding to the identification information of the Wi-Fi signal, where the database includes a mapping relationship between identification information of a Wi-Fi signal and identification information of a target object covered by the Wi-Fi signal; determining an eigenvalue of the target object corresponding to the identification information, where the eigenvalue is used to represent a location relationship between the user equipment and the target object; and determining, based on the eigenvalue of the target object, whether a location of the user equipment is consistent with a location of the target object.

An implementation of the present application provides a location positioning device, including the following: an acquisition unit, configured to obtain feature information of a Wi-Fi signal detected by user equipment, where the feature information includes identification information of the Wi-Fi signal; a search unit, configured to search a database for identification information of a target object corresponding to the identification information of the Wi-Fi signal, where the database includes a mapping relationship between identification information of a Wi-Fi signal and identification information of a target object covered by the Wi-Fi signal; a determining unit, configured to determine an eigenvalue of the target object corresponding to the identification information, where the eigenvalue is used to represent a location relationship between the user equipment and the target object; and a location determining unit, configured to determine, based on the eigenvalue of the target object, whether a location of the user equipment is consistent with a location of the target object.

In the technical solutions provided in the implementations of the present application, the identification information of the target object covered by the Wi-Fi signal is identified based on the feature information of the Wi-Fi signal detected by the user equipment, and the eigenvalue of the target object is determined, so as to determine the location of the user equipment based on the eigenvalue of the target object. Because coverage of the Wi-Fi signal is relatively small, the accuracy of the user equipment's location based on the Wi-Fi signal is relatively high.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

Figure 1:
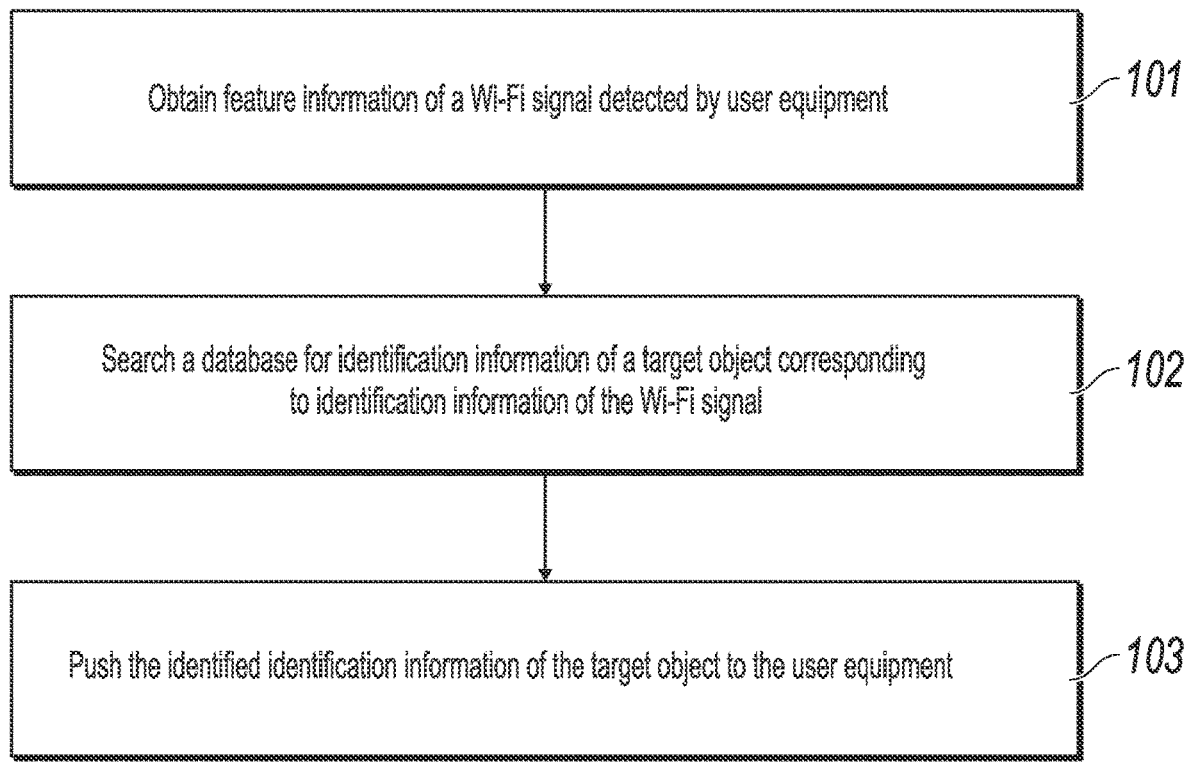
FIG. 1 is a schematic flowchart illustrating an information pushing method, according to an implementation of the present application.

In the existing technology, when an Internet platform is to display, to a user based on geographical location information of the user, information about a target object that is relatively close to the user, the Internet platform can match user's geographical location information and address information of the target object, and display the information about the target object to the user based on a matching result. However, the accuracy of the determined target object is relatively low as the matching accuracy is relatively low. For example, if a target object obtained through matching is actually relatively far away from the user, it is relatively difficult for the user to determine the actual location of the target object, causing relatively poor user experience.

Wireless Fidelity (Wi-Fi) is a wireless network transmission technology that enables terminals such as a personal computer and a handheld device (for example, a Pad or a mobile phone) to be wirelessly connected to each other in a short distance. In recent years, Wi-Fi technologies are increasingly applied in various public places with the rapid development, for example, office places and shopping places. Generally, when a user needs to access the Internet through Wi-Fi in a certain public area, the user can search for a Wi-Fi signal provided by the public area to the outside with user equipment. After identifying the Wi-Fi signal, the user equipment can display a name of the Wi-Fi signal, and at this time, the user equipment can be connected to the Wi-Fi signal.

As such, after the user's user equipment in a public area is connected to a certain Wi-Fi signal, a public area that the user is currently located in can be determined based on the connected Wi-Fi signal because the connected Wi-Fi signal is provided by the public place. The accuracy of the public area determined based on the Wi-Fi signal is relatively high because coverage of the Wi-Fi signal is relatively small.

It can be seen that, when displaying the information about the target object to the user, the Internet platform can determine, based on a Wi-Fi signal to which the user equipment is connected, a target object providing the Wi-Fi signal. Because the accuracy of a target object determined based on a Wi-Fi signal is relatively high, an actual demand of the user can be satisfied when the information about the target object is displayed to the user.

In the existing technology, whether the user arrives at the target object can be determined by using the Wi-Fi signal, to display the information about the target object to the user. Identification information of the Wi-Fi signal corresponding to the target object can be predetermined. Therefore, when detecting the Wi-Fi signal, the user equipment can determine the target object based on the Wi-Fi signal, and display the information about the target object to the user.

However, in the existing method, when determining the identification information of the Wi-Fi signal that corresponds to the target object, the identification information of the Wi-Fi signal is usually manually uploaded, or the Wi-Fi signal to which the user equipment is connected is usually obtained when the user makes a payment by scanning a QR code in the target object. For a manual Wi-Fi signal uploading method, efficiency of obtaining identification information of a Wi-Fi signal is relatively low, and the Wi-Fi signal of the target object cannot be updated in time when the target object changes the Wi-Fi signal. The method for obtaining a Wi-Fi signal during payment transaction is applicable only to a relatively large shop, and is applicable only to a target object provided with a Wi-Fi signal. Consequently, it is relatively difficult to determine the target object based on the Wi-Fi signal.

In the technical solutions provided in the implementations of the present application, the information about the target object covered by the Wi-Fi signal can be displayed to the user based on the Wi-Fi signal detected by the user equipment, so that the information about the target object that is provided for the user can satisfy the actual demand of the user, thereby improving user experience.

In addition, in the technical solutions provided in the implementations of the present application, the user does not need to manually upload the identification information of the Wi-Fi signal corresponding to the target object, and the Wi-Fi signal corresponding to the target object determined in the implementations of the present application can be a Wi-Fi signal provided by the target object to the outside, or can be another Wi-Fi signal that covers the target object. Therefore, provided that the target object can receive the Wi-Fi signal, the target object can be determined by using the Wi-Fi signal that covers the target object, thereby resolving the previous problem.

To achieve an objective of the present application, the implementations of the present application provide an information pushing method and a location positioning method and device. Feature information of a Wi-Fi signal detected by user equipment is obtained, where the feature information includes identification information of the Wi-Fi signal; and identification information of a target object corresponding to the identification information of the Wi-Fi signal is identified from a database, where the database includes a mapping relationship between identification information of a Wi-Fi signal and identification information of a target object covered by the Wi-Fi signal; and the identified identification information of the target object is pushed to the user equipment.

The identification information of the target object covered by the Wi-Fi signal is determined based on the feature information of the Wi-Fi signal that can be currently detected by the user equipment, and the determined identification information of the target object is pushed to the user equipment, so that a user of the user equipment can quickly obtain the identification information of the target object. In addition, because coverage of the Wi-Fi signal is relatively small, the accuracy of the target object determined based on the Wi-Fi signal is relatively high, so that information about the target object displayed to the user can satisfy an actual demand of the user, thereby effectively improving user experience.

It is worthwhile to note that in the implementations of the present application, the target object can be a shop. The technical solutions provided in the implementations of the present application can be used to determine a shop that the user is currently located in, and display information about the shop to the user; or can be used to determine a shop near a location of the user, and display information about the determined shop nearby to the user. No limitation is imposed here.

The following clearly and comprehensively describes the technical solutions in the present application with reference to the specific implementations of the present application and the corresponding accompanying drawings. Apparently, the described implementations are merely some but not all of the implementations of the present application. All other implementations obtained by a person of ordinary skill in the art based on the implementations of the present application without creative efforts shall fall within the protection scope of the present application.

The technical solutions provided in the implementations of the present application are described in detail below with reference to the accompanying drawings.

Implementation 1

FIG. 1 is a schematic flowchart illustrating an information pushing method, according to an implementation of the present application. The method includes the following steps.

Step 101: Obtain feature information of a Wi-Fi signal detected by user equipment.

The feature information includes identification information of the Wi-Fi signal.

In step 101, a user can detect, by using current user equipment, at least one Wi-Fi signal that covers the user equipment. In this situation, the feature information of the Wi-Fi signal can be obtained based on the Wi-Fi signal detected by the user equipment.

The user equipment is a device that can detect a Wi-Fi signal. In this implementation of the present application, the user equipment can be an intelligent terminal device such as a smartphone, a notebook computer, or an iPad, or can be another device that can detect a Wi-Fi signal, which is not limited.

When using the user equipment, the user can enable a function control configured to detect a Wi-Fi signal in the user equipment. In this situation, the user equipment can detect a Wi-Fi signal that covers the user equipment. After the Wi-Fi signal is detected, a Wi-Fi name corresponding to the detected Wi-Fi signal can be displayed on the user equipment. The Wi-Fi name here is a name of a device (such as a wireless router) that transmits the Wi-Fi signal. In practice, the Wi-Fi name can be manually set.

For example, the user equipment can detect a Wi-Fi signal that covers the user equipment and that has a Wi-Fi name "XXXX", so that the Wi-Fi name "XXXX" corresponding to the Wi-Fi signal can be displayed on the user equipment when the user equipment detects the Wi-Fi signal corresponding to the Wi-Fi name.

In practice, one or more Wi-Fi signals may cover the user equipment. If a plurality of Wi-Fi signals cover the user equipment, a Wi-Fi name corresponding to each detected Wi-Fi signal can be displayed on the user equipment after the user equipment detects the plurality of Wi-Fi signals.

After the Wi-Fi name corresponding to the detected Wi-Fi signal is displayed on the user equipment, the feature information of the Wi-Fi signal can be obtained based on the Wi-Fi name displayed on the user equipment, where the feature information of the Wi-Fi signal can include the identification information of the Wi-Fi signal.

In this implementation of the present application, the identification information of the Wi-Fi signal can be a Media Access Control (MAC) address corresponding to the Wi-Fi signal, or can be the Wi-Fi name corresponding to the Wi-Fi signal, which is not limited.

Optionally, the feature information of the Wi-Fi signal can further include a signal strength of the Wi-Fi signal, and the signal strength of the Wi-Fi signal here is a signal strength of the Wi-Fi signal that can be received by the user equipment when the user equipment detects the Wi-Fi signal.

After the user equipment detects the Wi-Fi signal, a server can obtain the feature information of the Wi-Fi signal.

The server can obtain, at least by using the following methods, the feature information of the Wi-Fi signal detected by the user equipment.

Method 1: When detecting the Wi-Fi signal and determining to establish a data connection to the server, the user equipment can send the feature information of the detected Wi-Fi signal to the server, so that the server can obtain the feature information of the Wi-Fi signal.

The user equipment can establish the data connection to the server before or when detecting the Wi-Fi signal, which is not limited.

Method 2: A data connection between a device (such as a wireless router) that transmits a Wi-Fi signal and the server can be established in advance. As such, when determining the Wi-Fi signal detected by the user equipment, the device that transmits the Wi-Fi signal can determine the feature information of the Wi-Fi signal detected by the user equipment, and send the feature information of the Wi-Fi signal and a device identity of the user equipment to the server, so that the server can obtain the feature information of the Wi-Fi signal detected by the user equipment.

In this implementation of the present application, the server can be a server corresponding to application software. Alternatively, the server can obtain, by using another method, the feature information of the Wi-Fi signal detected by the user equipment, which is not limited.

As such, based on the previously described method, the server can obtain the feature information of the Wi-Fi signal detected by the user equipment.

Step 102: Search a database for identification information of a target object corresponding to identification information of the Wi-Fi signal.

The database includes a mapping relationship between identification information of a Wi-Fi signal and identification information of a target object covered by the Wi-Fi signal.

In step 102, after the feature information of the Wi-Fi signal is obtained, the identification information of the target object corresponding to the identification information of the Wi-Fi signal can be identified from the database based on the identification information of the Wi-Fi signal included in the feature information, so as to push the identified identification information of the target object to the user equipment.

In this implementation of the present application, the mapping relationship between identification information of a Wi-Fi signal and identification information of a target object covered by the Wi-Fi signal can be pre-stored in the database. As such, when the identification information of the Wi-Fi signal is obtained, the identification information of the target object corresponding to the identification information of the Wi-Fi signal can be identified from the database based on the identification information of the Wi-Fi signal.

The database can be determined by using the following method, including the following steps.

Step 1: Obtain feature information of the Wi-Fi signal that covers the target object, where the feature information of the Wi-Fi signal is included in a service request sent by a user, the feature information of the Wi-Fi signal includes the identification information of the Wi-Fi signal and the signal strength of the Wi-Fi signal, and the service request includes the identification information of the target object.

In practice, the user can use the user equipment to detect the Wi-Fi signal in a location of the target object. Because the user is located in the vicinity or within the target object, the Wi-Fi signal detected by the user equipment is the Wi-Fi signal that covers the target object. In this situation, the user can access the Internet by using the Wi-Fi signal, and send a service request related to the target object to the server. The service request can include the identification information of the target object and the feature information of the Wi-Fi signal that is connected to the user equipment and that covers the target object.

The feature information can include the identification information of the Wi-Fi signal and the signal strength of the Wi-Fi signal. The signal strength of the Wi-Fi signal here is a signal strength of the Wi-Fi signal received by the user equipment when the user sends the service request.

The Wi-Fi signal (namely, the Wi-Fi signal that covers the target object) detected by the user equipment here can be a Wi-Fi signal provided by the target object to the outside, or can be another Wi-Fi signal (namely, another Wi-Fi signal that covers the target object) that can be received by the target object, which is not limited. There can be one or more Wi-Fi signals covering the target object. In this implementation of the present application, the user equipment can be connected to one of the Wi-Fi signals, and add feature information of the connected Wi-Fi signal or feature information of the plurality of Wi-Fi signals that cover the target object to the service request when the user sends the service request, which is not limited.

Optionally, after the feature information of the Wi-Fi signals is obtained, the obtained Wi-Fi signals can be screened to exclude abnormal Wi-Fi signals, such as Wi-Fi signals with an abnormal MAC address (for example, the MAC address is "00") or Wi-Fi signals with an abnormal Wi-Fi name (for example, the Wi-Fi name is "–"). In addition, a strength range of Wi-Fi signals can be preset to exclude Wi-Fi signals with signal strengths exceeding the preset range, and the strength range of the Wi-Fi signals here can be manually set. Preferably, the strength range can be from 0 dB to −120 dB.

Step 2: Establish a mapping relationship between identification information of a target object, identification information of a Wi-Fi signal that covers the target object, and a signal strength of the Wi-Fi signal, and store the mapping relationship in the database.

The mapping relationship between identification information of a target object, identification information of a Wi-Fi signal that covers the target object, and a signal strength of the Wi-Fi signal can be established after the feature information of the Wi-Fi signal that covers the target object is obtained.

In practice, for one target object, when a plurality of different user equipments are connected to a Wi-Fi signal that covers the target object, service requests sent by the different user equipments are received, and feature information of a Wi-Fi signal used by the user equipment is obtained from the received service requests. As such, the mapping relationship between identification information of a target object, identification information of a Wi-Fi signal that covers the target object, and a signal strength of the Wi-Fi signal can be established based on the obtained feature information of the Wi-Fi signal.

In practice, one or more Wi-Fi signals may be obtained based on the target object. Therefore, the following two situations can be separately analyzed when the mapping relationship is established.

Situation 1: One Wi-Fi signal is obtained based on the target object.

The identification information of the Wi-Fi signal, the identification information of the target object, and the signal strength of the Wi-Fi signal need to be determined when the mapping relationship is established. The identification information of the target object can be determined based on the service request sent by the user, and the identification information of the Wi-Fi signal can be determined based on the Wi-Fi signal.

When the signal strength of the Wi-Fi signal is determined, because signal strengths of Wi-Fi signals detected by (different) user equipments can be different in practice, an average value of different signal strengths of the detected Wi-Fi signals can be calculated, and the calculated average value is used as the signal strength of the Wi-Fi signal.

Optionally, the signal strength of the Wi-Fi signal can be determined based on an actual situation, which is not limited here.

The mapping relationship between identification information of a target object, identification information of a Wi-Fi signal that covers the target object, and a signal strength of the Wi-Fi signal can be established after the signal strength of the Wi-Fi signal is determined.

Situation 2: A plurality of Wi-Fi signals are obtained based on the target object.

In this situation, identification information of the plurality of Wi-Fi signals and the identification information of the target object can be determined by using the method described in situation 1. Details are omitted here for simplicity.

A signal strength of each of the plurality of Wi-Fi signals can be determined by using the method described in situation 1. Details are omitted here for simplicity.

The mapping relationship between identification information of a target object, identification information of a Wi-Fi signal that covers the target object, and a signal strength of the Wi-Fi signal can be established after the signal strength of the Wi-Fi signal is determined.

Optionally, for situation 2, if a plurality of Wi-Fi signals are obtained based on the target object, the plurality of obtained Wi-Fi signals can be screened to select at least one Wi-Fi signal, to establish a mapping relationship between identification information of a target object, identification information of a selected Wi-Fi signal, and a signal strength of the selected Wi-Fi signal.

When the plurality of obtained Wi-Fi signals are screened, a number of times that a plurality of Wi-Fi signals detected by different user equipments can be calculated based on the target object, and the plurality of obtained Wi-Fi signals can be screened based on the calculated number (or quantity) of times.

For example, Wi-Fi signals obtained based on the target object can include Wi-Fi signal A, Wi-Fi signal B, Wi-Fi signal C, Wi-Fi signal D, and Wi-Fi signal E, user equipment a can detect Wi-Fi signal A, Wi-Fi signal B, and Wi-Fi signal C, user equipment b can detect Wi-Fi signal B, Wi-Fi signal C, and Wi-Fi signal D, user equipment c can detect Wi-Fi signal B, Wi-Fi signal D, and Wi-Fi signal E, and user equipment d can detect Wi-Fi signal B and Wi-Fi signal C.

It can be obtained, through calculation, that Wi-Fi signal A is detected by different user equipments once, Wi-Fi signal B is detected by different user equipments for four times, Wi-Fi signal C is detected by different user equipments for three times, Wi-Fi signal D is detected by different user equipments twice, and Wi-Fi signal E is detected by different user equipments once. In this situation, the previous five Wi-Fi signals can be sorted in a sequence of a quantity of times of detection by different user equipments: Wi-Fi signal B, Wi-Fi signal C, Wi-Fi signal D, and Wi-Fi signal A/Wi-Fi signal E.

Therefore, when the previous five Wi-Fi signals are screened, Wi-Fi signal B that was detected by different user equipments for the largest quantity of times can be selected, or a preset quantity of Wi-Fi signals can be selected in a sequence of a quantity of times of detection by different user equipments. The preset quantity can be determined based on an actual situation. For example, when the preset quantity is 2, Wi-Fi signal B and Wi-Fi signal C can be selected; or when the preset quantity is 3, Wi-Fi signal B, Wi-Fi signal C, and Wi-Fi signal D can be selected.

In addition, in this implementation of the present application, when a plurality of Wi-Fi signals are obtained, the plurality of Wi-Fi signals can be screened based on an actual situation, which is not limited here.

After at least one Wi-Fi signal is selected, a mapping relationship between identification information of a target object, identification information of the at least one selected Wi-Fi signal, and a signal strength of the at least one selected Wi-Fi signal can be established.

Wi-Fi signal A, Wi-Fi signal B, Wi-Fi signal C, Wi-Fi signal D, and Wi-Fi signal E are still used as an example. If Wi-Fi signal B is selected, a mapping relationship between identification information of the target object, identification information of Wi-Fi signal B, and a signal strength of Wi-Fi signal B can be established. If Wi-Fi signal B and Wi-Fi signal C are selected, a mapping relationship between identification information of the target object, identification information of Wi-Fi signal B, identification information of Wi-Fi signal C, a signal strength of Wi-Fi signal B, and a signal strength of Wi-Fi signal C can be established.

As such, for one target object, a mapping relationship between identification information of the target object, identification information of a Wi-Fi signal that covers the target object, and a signal strength of the Wi-Fi signal can be obtained. For a plurality of target objects, a mapping relationship between identification information of each target object, identification information of at least one Wi-Fi signal that covers the target object, and a signal strength of the at least one Wi-Fi signal can be obtained by using the previously described method.

As such, for one Wi-Fi signal, a mapping relationship between identification information of the Wi-Fi signal, identification information of at least one target object covered by the Wi-Fi signal, and a signal strength of the Wi-Fi signal received by the target object can be determined based on the mapping relationship obtained by using the previous method.

The mapping relationship can be stored in the database after the mapping relationship is obtained.

As such, when the identification information of the target object corresponding to the identification information of the Wi-Fi signal is identified from the database based on the identification information of the Wi-Fi signal detected by the user equipment, the identification information of the Wi-Fi signal can be matched with the identification information of the Wi-Fi signal included in the mapping relationship stored in the database, to obtain the mapping relationship including the identification information of the Wi-Fi signal, and the identification information of the target object that establishes the mapping relationship with the identification information of the Wi-Fi signal is determined based on the obtained mapping relationship.

When the identification information of the Wi-Fi signal is matched with the identification information of the Wi-Fi signal included in the mapping relationship stored in the database, the mapping relationship can be the previously described mapping relationship between identification information of a Wi-Fi signal, identification information of at least one target object covered by the Wi-Fi signal, and a signal strength of the Wi-Fi signal received by the target object, or can be the previously described mapping relationship between identification information of each target object, identification information of at least one Wi-Fi signal that covers the target object, and a signal strength of the at least one Wi-Fi signal, which is not limited.

As such, the identification information of the target object corresponding to the identification information of the Wi-Fi signal detected by the user equipment can be identified.

Step 103: Push the identified identification information of the target object to the user equipment.

In step 103, when the identification information of the target object corresponding to the identification information of the Wi-Fi signal is identified, the identification information of the target object can be pushed to the user equipment, so that the user of the user equipment can conveniently check the identification information of the target object.

According to the method described in step 102, the identification information of the target object covered by the Wi-Fi signal can be identified based on the identification information of the Wi-Fi signal, and the identification information of the target object can be pushed to the user equipment when the identification information of the target object is identified.

In practice, one or more Wi-Fi signals may be detected by the user equipment. In addition, for each Wi-Fi signal, one or more target objects corresponding to the identification information of the Wi-Fi signal may be identified. Therefore, when the identification information of the target object is pushed to the user equipment, if one target object is identified, the identification information of the target object can be recommended to the user equipment; or if a plurality of target objects are identified, identification information of the plurality of target objects can be pushed to the user equipment, or the plurality of target objects can be screened, and identification information of at least one selected target object is pushed to the user equipment.

In this implementation of the present application, searching the database for the identification information of the target object based on the identification information of the detected Wi-Fi signal includes at least the following situations:

Situation 1: There is one Wi-Fi signal, and one target object is identified.

Situation 2: There is one Wi-Fi signal, and a plurality of target objects are identified.

Situation 3: There are a plurality of Wi-Fi signals, and one target object is identified.

Situation 4: There are a plurality of Wi-Fi signals, and a plurality of target objects are identified.

The previous four situations are separately analyzed below to describe how to push the identification information of the identified target object to the user equipment.

Situation 1:

When one Wi-Fi signal and one target object are identified, the identification information of the target object can be pushed to the user equipment.

Situation 2:

When one Wi-Fi signal and a plurality of target objects are identified, at least one target object can be selected, and identification information of the selected target object is pushed to the user of the user equipment.

The pushing the identified identification information of the target object to the user equipment includes the following: when it is determined that a quantity of identified target objects is greater than 1, determining a first signal strength of the Wi-Fi signal detected by the user equipment; searching the database for a second signal strength of the Wi-Fi signal that has the mapping relationship with the identification information of the target object, where the database includes a mapping relationship between identification information of a target object, identification information of a Wi-Fi signal that covers the target object, and a signal strength of the Wi-Fi signal; and selecting at least one target object based on the first signal strength of the Wi-Fi signal and the second signal strength of the Wi-Fi signal, and pushing identification information of the selected target object to the user equipment.

When the quantity of target objects is greater than 1, the signal strength of the Wi-Fi signal detected by the user equipment can be determined. The signal strength of the Wi-Fi signal can be determined based on the feature information of the detected Wi-Fi signal.

In this situation, the signal strength of the Wi-Fi signal corresponding to identification information of each target object can be identified from the previously described database based on identification information of the plurality of identified target objects.

In this implementation of the present application, for ease of differentiation, the signal strength of the Wi-Fi signal detected by the user equipment can be referred to as the first signal strength of the Wi-Fi signal, and the signal strength of the Wi-Fi signal identified from the database can be referred to as the second signal strength of the Wi-Fi signal.

After the first signal strength of the Wi-Fi signal and the second signal strength of the Wi-Fi signal are determined, the at least one target object can be selected based on the first signal strength of the Wi-Fi signal and the second signal strength of the Wi-Fi signal.

The selecting at least one target object based on the first signal strength of the Wi-Fi signal and the second signal strength of the Wi-Fi signal includes: calculating an eigenvalue of the target object based on the first signal strength of the Wi-Fi signal and the second signal strength of the Wi-Fi signal, where the eigenvalue is used to represent a location relationship between the user equipment and the target object; and selecting the at least one target object based on the eigenvalue of the target object.

For one target object, when the first signal strength of the Wi-Fi signal and the second signal strength of the Wi-Fi signal received by the target object are determined, the eigenvalue of the target object can be calculated, and the eigenvalue here can be used to represent the location relationship between the target object and the user equipment.

The eigenvalue of the target object can be calculated based on the first signal strength of the Wi-Fi signal and the second signal strength of the Wi-Fi signal by using the following equation:

$$\lambda = \frac{1}{|s_2 - s_1| + a} + b,$$

where $\lambda$ is the eigenvalue of the target object, $s_1$ is the first signal strength of the Wi-Fi signal, $s_2$ is the second signal strength of the Wi-Fi signal received by (and mapped with) the target object, and a and b are preset parameters.

In this implementation of the present application, a and b can be used to limit a value range of the eigenvalue of the target object, and can be determined based on an actual situation. Preferably, a can be 1, and b can be 1.

The eigenvalue of each target object can be obtained by using the previously described equation.

Optionally, in this implementation of the present application, the eigenvalue of each target object can alternatively be obtained by using another method, which is not limited here.

For example, for one target object, an absolute value of a difference between the first signal strength of the Wi-Fi signal and the second signal strength of the Wi-Fi signal received by the target object can be calculated, and the calculated absolute value of the difference can be used as the eigenvalue of the target object.

After the eigenvalue of each target object is obtained, the at least one target object can be selected based on the eigenvalue.

The at least one target object can be sorted in ascending order of eigenvalues or in descending order of eigenvalues, which is not limited here.

After the at least one target object is sorted, at least one target object can be selected based on a sorting result.

It can be seen from the previously described equation that the smaller difference between the first signal strength of the Wi-Fi signal and the second signal strength of the Wi-Fi signal received by the target object indicates the larger eigenvalue of the target object. In practice, a smaller difference between the first signal strength of the Wi-Fi signal and the second signal strength of the Wi-Fi signal indicates a shorter distance between the user equipment and the target object. Therefore, when the at least one target object is selected based on the sorting result, at least one target object having an eigenvalue greater than a preset threshold can be selected in descending order of eigenvalues of the target objects, and the preset threshold here can be determined based on an actual situation.

Optionally, for the previously described situation of using the absolute value of the difference between the first signal strength of the Wi-Fi signal and the second signal strength of the Wi-Fi signal received by the target object as the eigenvalue of the target object, a smaller difference between the first signal strength of the Wi-Fi signal and the second signal strength of the Wi-Fi signal received by the target object indicates a smaller eigenvalue of the target object, and indicates a shorter distance between the user equipment and the target object in practice. In this situation, at least one target object having an eigenvalue less than a preset threshold can be selected when the at least one target object is selected based on a sorting result, and the preset threshold here can be determined based on an actual situation.

In this implementation of the present application, the at least one target object can alternatively be selected based on an actual situation, which is not limited here.

Situation 3:

When there are a plurality of Wi-Fi signals, and one target object is identified, the identification information of the target object can be pushed to the user equipment.

Situation 4:

When there are a plurality of Wi-Fi signals, and a plurality of target objects are identified, at least one target object can be selected, and identification information of the selected target object is pushed to the user equipment.

When the at least one target object is selected, the first signal strength of each Wi-Fi signal detected by the user equipment can be determined by using the method described in situation 2, and the second signal strength of the Wi-Fi signal received by each target object is identified. Details are omitted here for simplicity.

After the first signal strength of each detected Wi-Fi signal and the second signal strength of the Wi-Fi signal received by each target object are determined, an eigenvalue of each target object can be calculated.

The eigenvalue of each target object can be calculated by using at least the following several methods.

Method 1:

The eigenvalue of each target object can be calculated by using the following equation:

$$\lambda_j = \sum_{i=1}^{m}\left(\frac{1}{|s_{ij} - s_i| + a} + b\right),$$

where $\lambda_j$ is an eigenvalue of target object j, m is a quantity of Wi-Fi signals detected by the user equipment, a value range of i is [1, m], j is identification information of the target object, $s_{ij}$ is a second signal strength of an ith Wi-Fi signal received by target object j, $s_i$ is a first signal strength of the ith Wi-Fi signal, and a and b are preset parameters.

In this implementation of the present application, a and b can be used to limit a value range of the eigenvalue of the target object, and can be determined based on an actual situation. For example, a can be 1, and b can be 1.

In practice, for one target object, a larger quantity of Wi-Fi signals (Wi-Fi signals here are Wi-Fi signals detected by the user equipment) received by the target object indicates a shorter distance between the target object and the user equipment. For one Wi-Fi signal received by the target object, it can be seen from the equation that the smaller difference between the first signal strength of the Wi-Fi signal detected by the user equipment and the second signal strength of the Wi-Fi signal received by the target object, and the shorter distance between the user equipment and the target object indicate a larger eigenvalue of the target object.

Therefore, when the eigenvalue of the target object is calculated, if a plurality of Wi-Fi signals can be received by the target object, eigenvalues of target objects corresponding to the Wi-Fi signals can be added. As such, a larger eigenvalue of the target object indicates a shorter distance between the target object and the user equipment.

Figure 2:
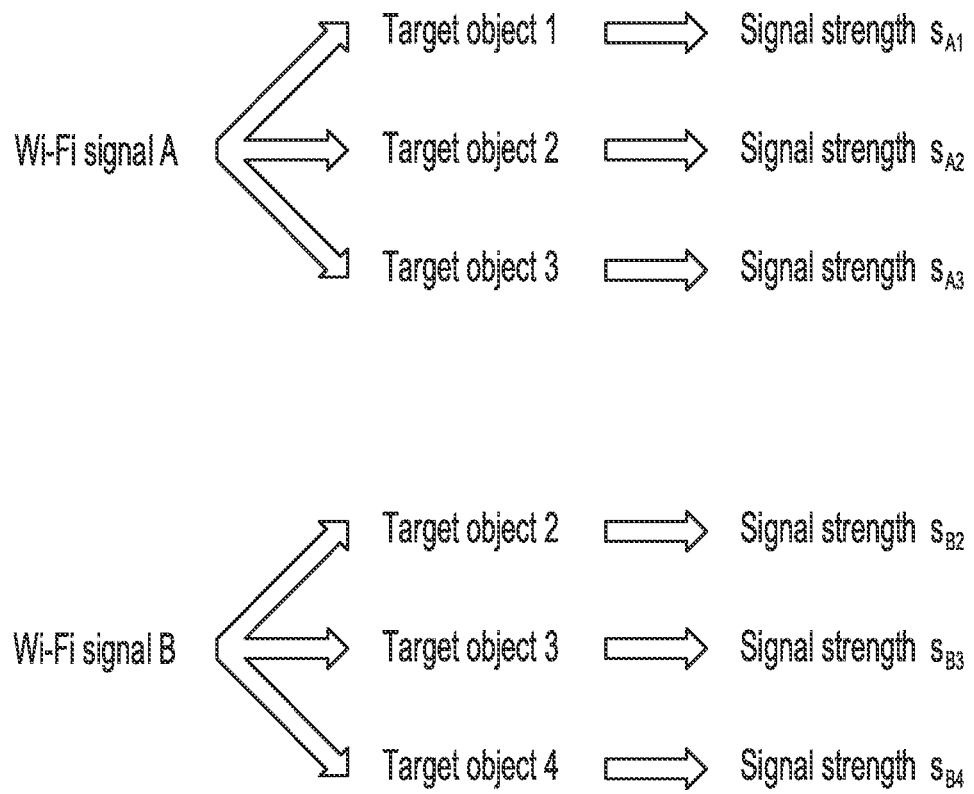
FIG. 2 is a schematic diagram illustrating a mapping relationship between identification information of a Wi-Fi signal, a target object covered by the Wi-Fi signal, and a signal strength of the Wi-Fi signal, according to an implementation of the present application.

As shown in FIG. 2, two Wi-Fi signals are detected by the user equipment: Wi-Fi signal A and Wi-Fi signal B, a signal strength of detected Wi-Fi signal A is $s_A$, and a signal strength of detected Wi-Fi signal B is $s_B$.

Target objects that are covered by Wi-Fi signal A and that can be identified from the database based on identification information of Wi-Fi signal A are target object 1, target object 2, and target object 3. In addition, a signal strength of Wi-Fi signal A received by target object 1 identified from the database is $s_{A1}$, a signal strength of Wi-Fi signal A received by target object 2 is $s_{A2}$, and a signal strength of Wi-Fi signal A received by target object 3 is $s_{A3}$.

Target objects that are covered by Wi-Fi signal B and that can be identified from the database based on identification information of Wi-Fi signal B are target object 2, target object 3, and target object 4. In addition, a signal strength of Wi-Fi signal B received by target object 2 identified from the database is $s_{B2}$, a signal strength of Wi-Fi signal B received by target object 3 is $s_{B3}$, and a signal strength of Wi-Fi signal B received by target object 4 is $s_{B4}$.

Eigenvalues of target object 1, target object 2, target object 3, and target object 4 can be separately calculated based on the previously described equation, where preset parameter a is 1, and preset parameter b is 1.

An eigenvalue of target object 1 is:

$$\lambda_1 = \frac{1}{|s_{A1} - s_A| + 1} + 1;$$

an eigenvalue of target object 2 is:

$$\lambda_2 = \left(\frac{1}{|s_{A2} - s_A| + 1} + 1\right) + \left(\frac{1}{|s_{B2} - s_B| + 1} + 1\right);$$

an eigenvalue of target object 3 is:

$$\lambda_3 = \left(\frac{1}{|s_{A3} - s_A| + 1} + 1\right) + \left(\frac{1}{|s_{B3} - s_B| + 1} + 1\right);$$

and an eigenvalue of target object 4 is:

$$\lambda_4 = \frac{1}{|s_{B4} - s_B| + 1} + 1.$$

Method 2: The eigenvalue of the target object can be calculated by using the following equation:

$\lambda_j = m_j$, where $\lambda_j$ is an eigenvalue of target object j, j is identification information of the target object, $m_j$ is a quantity of Wi-Fi signals that can be received by target object j, and the Wi-Fi signal here is a Wi-Fi signal detected by the user equipment.

In practice, for one target object, a larger quantity of Wi-Fi signals (Wi-Fi signals here are Wi-Fi signals detected by the user equipment) received by (and mapped to) the target object indicates a shorter distance between the target object and the user equipment. Therefore, the eigenvalue of the target object can be determined based on a quantity of Wi-Fi signals that can be received by the target object. It can be seen from the equation in method 2, that a larger quantity of Wi-Fi signals received by the target object indicates a larger eigenvalue of the target object.

For example, as shown in FIG. 2, Wi-Fi signals detected by the user equipment are Wi-Fi signal A and Wi-Fi signal B. It can be determined that target object 1 can receive one Wi-Fi signal, target object 2 can receive two Wi-Fi signals, target object 3 can receive two Wi-Fi signals, and target object 4 can receive one Wi-Fi signal. In this situation, it can be determined that an eigenvalue of target object 1 is 1, an eigenvalue of target object 2 is 2, an eigenvalue of target object 3 is 2, and an eigenvalue of target object 4 is 1.

Optionally, in this implementation of the present application, the eigenvalue of each target object can alternatively be calculated by using another method, which is not limited here.

After the eigenvalue of each target object is obtained, the at least one target object can be selected based on the eigenvalue.

The at least one target object can be sorted in ascending order of eigenvalues or in descending order of eigenvalues, which is not limited here.

After the at least one target object is sorted, at least one target object can be selected based on a sorting result.

The following describes how to select at least one target object by using the previously described two methods.

Method 1:

It can be seen from the equation that a smaller difference between the first signal strength of the Wi-Fi signal and the second signal strength of the Wi-Fi signal received by the target object indicates a larger quantity of Wi-Fi signals received by the target object and a larger eigenvalue of the target object. In practice, a smaller difference between the first signal strength of the Wi-Fi signal and the second signal strength of the Wi-Fi signal received by the target object and a larger quantity of Wi-Fi signals received by the target object indicates a shorter distance between the user equipment and the target object. Therefore, when the at least one target object is selected based on the sorting result, at least one target object having an eigenvalue greater than a preset threshold can be selected in descending order of eigenvalues of the target objects, and the preset threshold here can be determined based on an actual situation.

Method 2:

It can be seen from the equation that a larger quantity of Wi-Fi signals received by the target object indicates a larger eigenvalue of the target object. In practice, a larger quantity of Wi-Fi signals received by the target object indicates a shorter distance between the user equipment and the target object. Therefore, when the at least one target object is selected based on the sorting result, at least one target object having an eigenvalue greater than a preset threshold can be selected in descending order of eigenvalues of the target objects, and the preset threshold here can be determined based on an actual situation.

In this implementation of the present application, the at least one target object can alternatively be selected based on an actual situation, which is not limited here.

Optionally, the method further includes: determining, based on the eigenvalue of the target object, whether a location of the user equipment is consistent with a location of the selected target object.

It can be seen from the previously described equation that a smaller difference between the first signal strength of the Wi-Fi signal and the second signal strength of the Wi-Fi signal indicates a larger quantity of Wi-Fi signals received by the target object and a larger eigenvalue of the target object. In practice, a smaller difference between the first signal strength and the second signal strength and a larger quantity of Wi-Fi signals received by the target object indicates a shorter distance between the user equipment and the target object. Therefore, after the eigenvalue of the target object is obtained, whether a location of the user equipment is consistent with a location of the selected target object can be determined based on the eigenvalue.

It can be determined, based on the eigenvalue of the target object, whether the eigenvalue of the target object is greater than a preset value. If yes, it indicates that a distance between the user equipment and the target object is relatively short; in other words, the location of the user equipment is consistent with the location of the target object.

The preset value here can be determined based on an actual situation, and is not limited.

Based on the previously described four situations, the identification information of the target object can be pushed to the user equipment after the identification information of the target object is determined, so that the user of the user equipment can obtain the identification information of the target object.

The pushing the identification information of the target object to the user equipment includes: determining push information about the target object, and pushing the push information to the user equipment.

To enable the user of the user equipment to obtain more information about the target object, the push information about the target object and the identification information of the target object can be jointly pushed to the user equipment.

In this implementation of the present application, the push information about the target object can be information about the target object. For example, when the target object is a shop, the push information can be information about merchandise in the shop (for example, price or sales information of the merchandise), or can be other information about the shop, which is not limited here.

After the push information about the target object is pushed to the user equipment, the user of the user equipment can obtain more information about the target object.

In practice, after obtaining the push information about the target object, the user can send a service request related to the target object to the server based on the obtained push information. In this situation, the server can receive the service request sent by the user.

Optionally, the method further includes: receiving a service request sent by a user, where the service request includes the identification information of the target object and the feature information of the Wi-Fi signal, and the feature information includes the identification information of the Wi-Fi signal and a signal strength of the Wi-Fi signal; and updating, based on the feature information of the Wi-Fi signal included in the service request, feature information of the Wi-Fi signal that is stored in the database and that covers the target object.

After the user sends the service request, the server can receive the service request. The service request can include the identification information of the target object and the feature information of the Wi-Fi signal. The feature information can include the identification information of the Wi-Fi signal and the signal strength of the Wi-Fi signal.

It is worthwhile to note that the Wi-Fi signal can be a Wi-Fi signal to which the user equipment is connected or at least one Wi-Fi signal detected by the user equipment when the user sends the service request, which is not limited.

After the identification information of the target object and the feature information of the Wi-Fi signal are obtained, the feature information of the Wi-Fi signal that is stored in the database and that corresponds to the identification information of the target object can be updated based on the obtained feature information of the Wi-Fi signal.

It can be determined whether the obtained feature information of the Wi-Fi signal is consistent with the feature information of the Wi-Fi signal that is stored in the database and that covers the target object. If not, the feature information of the Wi-Fi signal that is stored in the database and that covers the target object can be updated based on the obtained feature information of the Wi-Fi signal.

In the technical solution provided in this implementation of the present application, the identification information of the target object covered by the Wi-Fi signal is determined based on the feature information of the Wi-Fi signal that can be currently detected by the user equipment, and the determined identification information of the target object is pushed to the user equipment, so that the user of the user equipment can quickly obtain the identification information of the target object. In addition, because coverage of the Wi-Fi signal is relatively small, the accuracy of the target object determined based on the Wi-Fi signal is relatively high, so that information about the target object displayed to the user can satisfy an actual demand of the user, thereby effectively improving user experience.

Implementation 2

A shop is used below as an example of a target object to describe how to determine, by using the technical solution provided in this implementation of the present application, a shop relatively close to a user, and push identification information of the shop to the user.

First, a mapping relationship between the identification information of the shop, identification information of a Wi-Fi signal that covers the shop, and a signal strength of the Wi-Fi signal that covers the shop is determined.

The identification information of the shop here can be the name of the shop.

When the user is in the shop, user equipment can be used to connect to one of Wi-Fi signals that cover the shop. In this situation, if the user sends a service request related to the shop, a server can obtain feature information of the Wi-Fi signal to which the user equipment is connected when the user sends the service request, or can obtain feature information of a Wi-Fi signal detected by the user equipment within a preset period before and after the user sends the service request. The preset period here can be any period of time when the user is in the shop. For example, the preset period can be one minute, and the feature information of the Wi-Fi signal detected by the user equipment within one minute before and after a user transaction moment is obtained.

As such, feature information of Wi-Fi signals to which the user equipment is connected (or feature information of Wi-Fi signals detected by the user equipment) when the user in the shop sends the service request related to the shop within one month (or two months; the period is not limited) can be accumulated. After a large amount of feature information of the Wi-Fi signals is obtained, the accumulated feature information of the Wi-Fi signals can be analyzed and processed.

Optionally, a Wi-Fi signal with abnormal identification information can be excluded, and a Wi-Fi signal with a signal strength that ranges from 0 dB to −120 dB is selected.

When the identification information of the Wi-Fi signal that covers the shop is determined, if there are a plurality of Wi-Fi signals, a preset quantity of Wi-Fi signals detected by different user equipments for a relatively large quantity of times can be selected based on a quantity of times that the Wi-Fi signal is detected by different user equipments. For example, if there are 20 Wi-Fi signals, Wi-Fi signals detected by different user equipments for the first ten largest quantities of times can be selected.

When signal strengths of the Wi-Fi signals are determined, an average value of the signal strengths of the Wi-Fi signals can be calculated, and the average value is used as the signal strength of the Wi-Fi signal.

As such, the mapping relationship between the identification information of the shop, identification information of a Wi-Fi signal that covers the shop, and a signal strength of the Wi-Fi signal that covers the shop can be established.

For other shops, a mapping relationship between identification information of each shop, identification information of a Wi-Fi signal that covers the shop, and a signal strength of the Wi-Fi signal that covers the shop can be obtained by using the described method.

As such, for a plurality of shops, a mapping relationship between identification information of each shop, identification information of a Wi-Fi signal that covers the shop, and a signal strength of the Wi-Fi signal that covers the shop can be obtained. Further, for one Wi-Fi signal, a mapping relationship between identification information of the Wi-Fi signal, identification information of a shop covered by the Wi-Fi signal, and a signal strength of the Wi-Fi signal received by the shop can be obtained.

The mapping relationship can be stored in the database after the mapping relationship is obtained.

Next, information about the shop is pushed to the user based on the feature information of the Wi-Fi signal currently detected by the user equipment.

The identification information of the shop corresponding to the identification information of the Wi-Fi signal can be identified from the database based on the identification information of the Wi-Fi signal detected by the user equipment.

In this situation, if one shop is identified, push information about the shop can be pushed to the user equipment. If a plurality of shops are identified, eigenvalues of the shops can be calculated, at least one shop is selected based on the calculated eigenvalues, and push information about the selected shop is pushed to the user equipment, so that the user of the user equipment can obtain information about the shop based on the pushed information.

Figure 3:
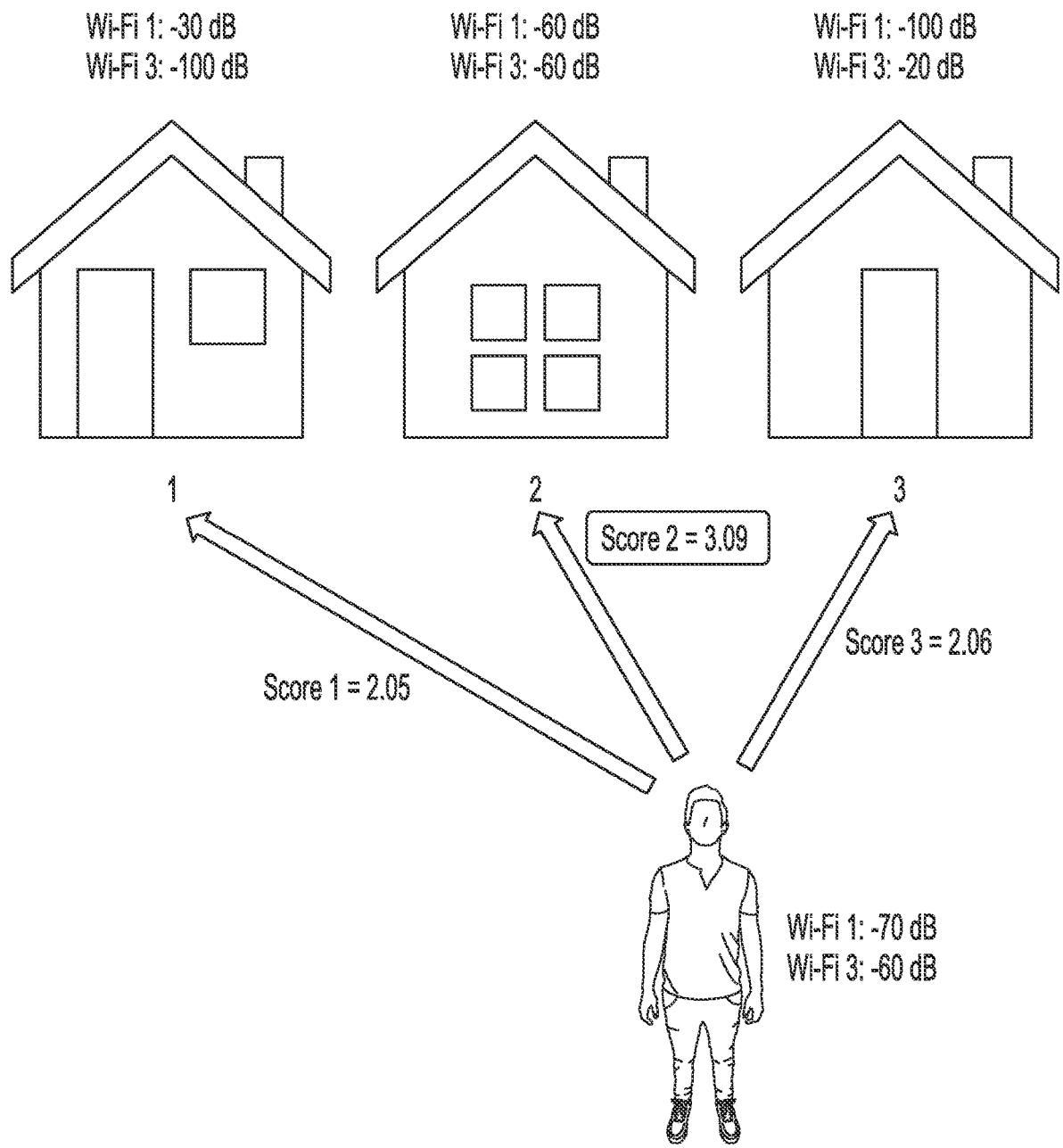
FIG. 3 is a schematic diagram illustrating determining eigenvalue of a shop, according to an implementation of the present application.

As shown in FIG. 3, Wi-Fi signals that can be detected by the user equipment are Wi-Fi 1 and Wi-Fi 3, a signal strength of Wi-Fi 1 detected by the user equipment is −70 dB, and a signal strength of Wi-Fi 3 is −60 dB.

It can be identified from the database that shops correspond to Wi-Fi 1 are shop 1, shop 2, and shop 3, a signal strength of Wi-Fi 1 received in shop 1 is −30 dB, a signal strength of Wi-Fi 1 received in shop 2 is −60 dB, and a signal strength of Wi-Fi 1 received in shop 3 is −100 dB.

It can be identified from the database that shops correspond to Wi-Fi 3 are shop 1, shop 2, and shop 3, a signal strength of Wi-Fi 3 received in shop 1 is −100 dB, a signal strength of Wi-Fi 3 received in shop 2 is −60 dB, and a signal strength of Wi-Fi 3 received in shop 3 is −20 dB.

It can be obtained, through calculation, that an eigenvalue of shop 1 is 2.05, an eigenvalue of shop 2 is 3.09, and an eigenvalue of shop 3 is 2.06. Therefore, push information about shop 2 can be pushed to the user equipment.

Optionally, because shop 1 and shop 3 are also covered by Wi-Fi 1 and Wi-Fi 3, push information about shop 1 and push information about shop 3 can also be pushed to the user equipment, and push information of three shops can be displayed to the user in this sequence: shop 2, shop 3, and shop 1.

Optionally, because the eigenvalue of shop 2 is the largest, it can be determined that a current location of the user is consistent with a location of shop 2; in other words, the user is in shop 2.

When the push information about shop 2 is pushed to the user equipment, the user equipment can display information about shop 2, for example, price information and sales information of all commodities in shop 2. Therefore, the user of the user equipment can quickly obtain the information about shop 2.

After obtaining the information about shop 2, the user can consume merchandise in shop 2. The user can send a service request including identification information of shop 2, and the service request can include feature information of a Wi-Fi signal to which the user equipment is connected. In this situation, the previously described mapping relationship between the identification information of the shop, identification information of a Wi-Fi signal that covers the shop, and a signal strength of the Wi-Fi signal that covers the shop can be updated based on the feature information of the Wi-Fi signal and the identification information of shop 2.

In practice, it can be determined, based on the feature information of the Wi-Fi signal detected by the user equipment, whether the user arrives at a certain shop. If yes, information about the shop can be displayed to the user. For example, when it is determined that the user arrives at a certain catering restaurant, catering information of the restaurant can be displayed to the user. In this situation, the user can order, purchase, etc., based on the displayed catering information. If not, information about a shop near a current location of the user can be displayed to the user.

In addition, feature information of a Wi-Fi signal detected by the user equipment each day can be obtained, and identification information and time information associated with a shop usually passed by the user are determined based on the obtained feature information of the Wi-Fi signal. As such, information about the shop can be displayed to the user in a specific time period. For example, if the user passes shop 1 at 8:00 a.m. to 9:00 a.m. every day, information about shop 1 can be pushed to the user before 8:00 every day, so that the user can consume merchandise based on the pushed information when passing shop 1 between 8:00 a.m. and 9:00 a.m.

Implementation 3

Figure 4:
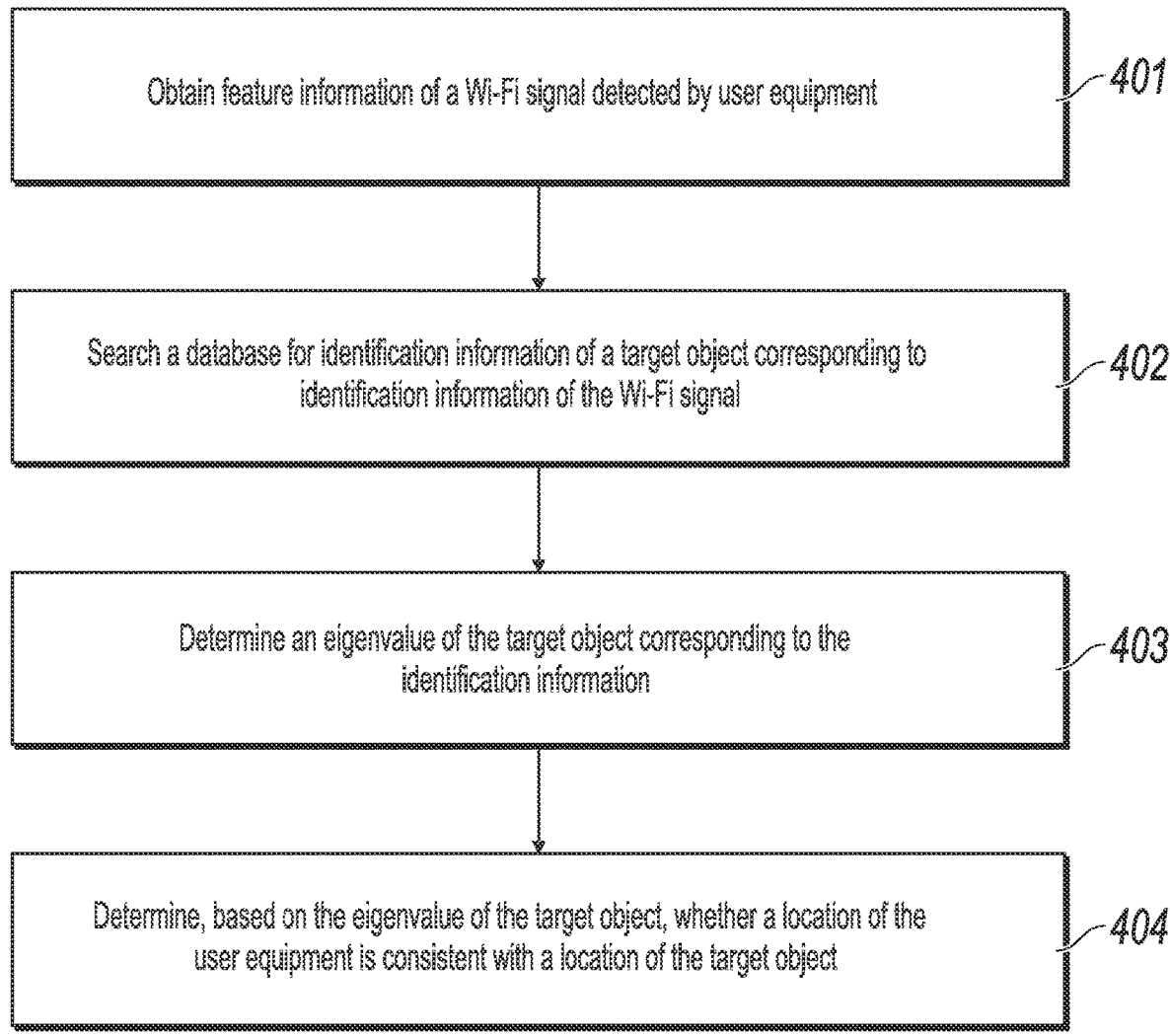
FIG. 4 is a schematic flowchart illustrating a location positioning method, according to an implementation of the present application.

FIG. 4 is a schematic flowchart illustrating a location positioning method, according to an implementation of the present application. The method includes the following steps.

Step 401: Obtain feature information of a Wi-Fi signal detected by user equipment.

The feature information includes identification information of the Wi-Fi signal.

In step 401, a user can detect, by using current user equipment, at least one Wi-Fi signal that covers the user equipment. In this situation, the feature information of the Wi-Fi signal can be obtained based on the Wi-Fi signal detected by the user equipment.

The feature information of the Wi-Fi signal can include the identification information of the Wi-Fi signal and a signal strength of the Wi-Fi signal.

In this implementation of the present application, a method for obtaining a Wi-Fi signal detected by the user equipment is the same as the method described in step 101. Details are omitted here for simplicity.

Step 402: Search a database for identification information of a target object corresponding to identification information of the Wi-Fi signal.

The database includes a mapping relationship between identification information of a Wi-Fi signal and identification information of a target object covered by the Wi-Fi signal.

In step 402, after the identification information of the Wi-Fi signal detected by the user equipment is obtained, the target object corresponding to the identification information of the Wi-Fi signal can be identified from the database based on the identification information of the Wi-Fi signal, so as to determine a location of the user equipment based on a location of the target object.

In this implementation of the present application, the mapping relationship between identification information of a Wi-Fi signal and identification information of a target object covered by the Wi-Fi signal can be pre-stored in the database. As such, when the identification information of the Wi-Fi signal is obtained, the identification information of the target object corresponding to the identification information of the Wi-Fi signal can be identified from the database based on the identification information of the Wi-Fi signal.

The database can be determined by using the following method, including the following steps.

Step 1: Obtain feature information of the Wi-Fi signal that covers the target object, where the feature information of the Wi-Fi signal is included in a service request sent by a user, the feature information of the Wi-Fi signal includes the identification information of the Wi-Fi signal and the signal strength of the Wi-Fi signal, and the service request includes the identification information of the target object.

In this implementation of the present application, the feature information of the Wi-Fi signal that covers the target object can be obtained by using the method described in step 102.

Details are omitted here for simplicity.

Step 2: Establish a mapping relationship between identification information of a target object, identification information of a Wi-Fi signal that covers the target object, and a signal strength of the Wi-Fi signal, and store the mapping relationship in the database.

After the identification information of the Wi-Fi signal that covers the target object is obtained, the mapping relationship between identification information of a target object, identification information of a Wi-Fi signal that covers the target object, and a signal strength of the Wi-Fi signal can be established by using the method described in step 102. Details are omitted here for simplicity.

In this implementation of the present application, a mapping relationship between identification information of a Wi-Fi signal, identification information of at least one target object covered by the Wi-Fi signal, and a signal strength of the Wi-Fi signal received by the target object can be further established by using the method described in step 102.

The mapping relationship can be stored in the database after the mapping relationship is obtained.

The identification information of the target object corresponding to the identification information of the Wi-Fi signal can be identified from the database by using the method described in step 102. Details are omitted here for simplicity.

Step 403: Determine an eigenvalue of the target object corresponding to the identification information.

The eigenvalue is used to represent a location relationship between the user equipment and the target object.

In step 403, after the identification information of the target object corresponding to the identification information of the Wi-Fi signal is identified, the eigenvalue of the target object corresponding to the identification information can be further determined, so as to determine, based on the eigenvalue of the target object, whether a location of the user equipment is consistent with a location of the target object. The eigenvalue of the target object can be used to represent the location relationship between the user equipment and the target object.

The determining an eigenvalue of the target object corresponding to the identification information includes: determining a first signal strength of the Wi-Fi signal detected by the user equipment; searching the database for a second signal strength of the Wi-Fi signal that has the mapping relationship with the identification information of the target object, where the database includes a mapping relationship between identification information of a target object, identification information of a Wi-Fi signal that covers the target object, and a signal strength of the Wi-Fi signal; and determining the eigenvalue of the target object based on the first signal strength of the Wi-Fi signal and the second signal strength of the Wi-Fi signal.

In this implementation of the present application, the first signal strength of the Wi-Fi signal detected by the user equipment can be determined by using the method described in step 103, and the second signal strength of the Wi-Fi signal that has the mapping relationship with the identification information of the target object is identified from the database by using the method described in step 103. Details are omitted here for simplicity.

After the first signal strength of the Wi-Fi signal and the second signal strength of the Wi-Fi signal are obtained, the eigenvalue of the target object can be calculated by using the method described in step 103. Details are omitted here for simplicity.

Step 404: Determine, based on the eigenvalue of the target object, whether a location of the user equipment is consistent with a location of the target object.

In step 404, after the eigenvalue of the target object is calculated, whether the location of the user equipment is consistent with the location of the target object can be determined based on the eigenvalue of the target object.

It is worthwhile to note that in practice, one or more Wi-Fi signals may be detected by the user equipment, and one or more target objects may be identified from the database. Therefore, when one target object is identified, it indicates that the user equipment and the target object can receive the Wi-Fi signal, and in this situation, it can be determined that the location of the user equipment is consistent with the location of the target object; or when a plurality of target objects are identified, the plurality of target objects can be screened, and the location of the user equipment is determined based on a location of the selected target object.

In this implementation of the present application, searching the database for the identification information of the target object based on the identification information of the detected Wi-Fi signal includes at least the following situations:

Situation 1: There is one Wi-Fi signal, and one target object is identified.

Situation 2: There is one Wi-Fi signal, and a plurality of target objects are identified.

Situation 3: There are a plurality of Wi-Fi signals, and one target object is identified.

Situation 4: There are a plurality of Wi-Fi signals, and a plurality of target objects are identified.

The previous four situations are separately analyzed below to describe how to determine, based on the eigenvalue of the target object, whether the location of the user equipment is consistent with the location of the target object.

Situation 1:

There is one Wi-Fi signal, and one target object is identified. In practice, it indicates that the user equipment and the target object can receive the Wi-Fi signal. In this situation, it can be determined that the location of the user equipment is consistent with the location of the target object.

Situation 2:

There is one Wi-Fi signal, and a plurality of target objects are identified. In practice, it indicates that the user equipment and the plurality of target objects can receive the Wi-Fi signal. When determining whether the location of the user equipment is consistent with the location of the target object based on an eigenvalue of each target object, it can be determined whether the eigenvalue of each target object is greater than a preset value. If yes, it indicates that the user equipment is relatively close to the target object. Therefore, it can be determined that the location of the user equipment is consistent with the location of the target object.

The preset value can be determined based on an actual situation, and is not limited here.

Situation 3:

There are a plurality of Wi-Fi signals, and one target object is identified. In practice, it indicates that the user equipment and the target object can receive the plurality of Wi-Fi signals. In this situation, it can be determined that the location of the user equipment is consistent with the location of the target object.

Situation 4:

There are a plurality of Wi-Fi signals, and a plurality of target objects are identified. In this situation, whether the location of the user equipment is consistent with the location of the target object can be determined by using the method described in situation 2 in this implementation of the present application. Details are omitted here for simplicity.

As such, whether the location of the user equipment is consistent with the location of the target object can be determined based on the described four situations and the eigenvalue of the target object.

In the technical solution provided in this implementation of the present application, the identification information of the target object covered by the Wi-Fi signal is identified based on the feature information of the Wi-Fi signal detected by the user equipment, and the eigenvalue of the target object is determined, so as to determine the location of the user equipment based on the eigenvalue of the target object. Because coverage of the Wi-Fi signal is relatively small, the accuracy of the user equipment's location determined based on the Wi-Fi signal is relatively high.

Implementation 4

Figure 5:
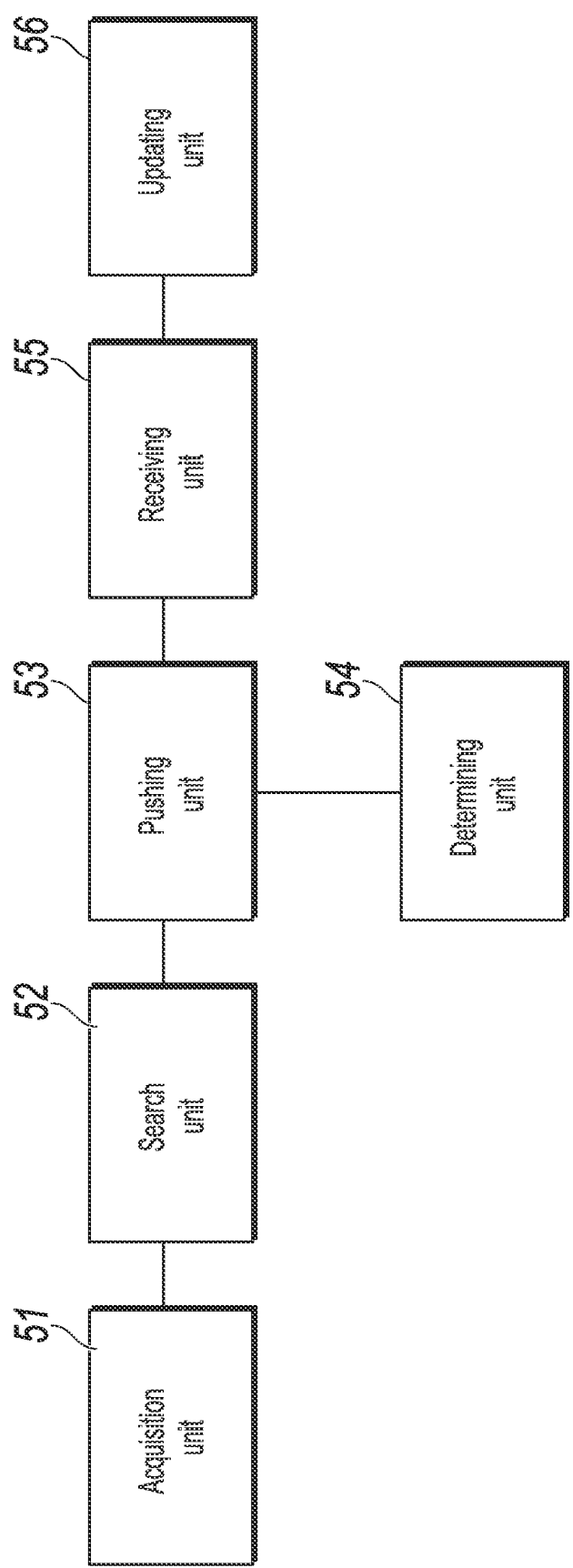
FIG. 5 is a schematic structural diagram illustrating an information pushing device, according to an implementation of the present application.

FIG. 5 is a schematic structural diagram illustrating an information pushing device, according to an implementation of the present application. The information pushing device includes an acquisition unit 51, a search unit 52, and a pushing unit 53.

The acquisition unit 51 obtains feature information of a Wi-Fi signal detected by user equipment, where the feature information includes identification information of the Wi-Fi signal.

The search unit 52 searches a database for identification information of a target object corresponding to the identification information of the Wi-Fi signal, where the database includes a mapping relationship between identification information of a Wi-Fi signal and identification information of a target object covered by the Wi-Fi signal.

The pushing unit 53 pushes the identification information of the target object identified by the search unit 52 to the user equipment.

The pushing unit 53 pushes the identification information of the target object identified by the search unit 52 to the user equipment, including: when it is determined that a quantity of identified target objects is greater than 1, determining a first signal strength of the Wi-Fi signal detected by the user equipment; searching the database for a second signal strength of the Wi-Fi signal that has the mapping relationship with the identification information of the target object, where the database includes a mapping relationship between identification information of a target object, identification information of a Wi-Fi signal that covers the target object, and a signal strength of the Wi-Fi signal; and selecting at least one target object based on the first signal strength of the Wi-Fi signal and the second signal strength of the Wi-Fi signal, and pushing identification information of the selected target object to the user equipment.

The pushing unit 53 selects at least one target object based on the first signal strength of the Wi-Fi signal and the second signal strength of the Wi-Fi signal, including: calculating an eigenvalue of the target object based on the first signal strength of the Wi-Fi signal and the second signal strength of the Wi-Fi signal, where the eigenvalue is used to represent a location relationship between the user equipment and the target object; and selecting the at least one target object based on the eigenvalue of the target object.

Optionally, the information pushing device further includes a determining unit 54.

The determining unit 54 determines, based on the eigenvalue of the target object, whether a location of the user equipment is consistent with a location of the target object.

The pushing unit 53 calculates an eigenvalue of the target object based on the first signal strength of the Wi-Fi signal and the second signal strength of the Wi-Fi signal, including: obtaining the eigenvalue of the target object through calculation by using the following equation:

$$\lambda = \frac{1}{|s_2 - s_1| + a} + b,$$

where $\lambda$ is the eigenvalue of the target object, $s_1$ is the first signal strength of the Wi-Fi signal, $s_2$ is the second signal strength of the Wi-Fi signal, and a and b are preset parameters.

The search unit 52 determines the database by using the following method, including: obtaining feature information of the Wi-Fi signal that covers the target object, where the feature information of the Wi-Fi signal is included in a service request sent by a user, the feature information of the Wi-Fi signal includes the identification information of the Wi-Fi signal and the signal strength of the Wi-Fi signal, and the service request includes the identification information of the target object; and establishing the mapping relationship between identification information of a target object, identification information of a Wi-Fi signal that covers the target object, and a signal strength of the Wi-Fi signal, and storing the mapping relationship in the database.

Optionally, the pushing unit 53 pushes the identification information of the target object identified by the search unit 52 to the user equipment, including: determining push information about the target object, and pushing the push information to the user equipment.

Optionally, the information pushing device further includes a receiving unit 55 and an updating unit 56.

The receiving unit 55 receives a service request sent by a user, where the service request includes the identification information of the target object and the feature information of the Wi-Fi signal, and the feature information includes the identification information of the Wi-Fi signal and a signal strength of the Wi-Fi signal.

The updating unit 56 updates, based on the feature information of the Wi-Fi signal included in the service request, feature information of the Wi-Fi signal that is stored in the database and that covers the target object.

It is worthwhile to note that the information pushing device provided in this implementation of the present application can be implemented by using hardware or software, which is not limited here.

The acquisition unit obtains the feature information of the Wi-Fi signal that can be detected by the user equipment, the search unit searches for the identification information of the target object covered by the Wi-Fi signal, and the pushing unit pushes the identification information of the target object identified by the search unit to the user equipment, so that a user of the user equipment can quickly obtain the identification information of the target object. In addition, because coverage of the Wi-Fi signal is relatively small, the accuracy of the target object determined based on the Wi-Fi signal is relatively high, so that information about the target object displayed to the user can satisfy an actual demand of the user, thereby effectively improving user experience.

Implementation 5

Figure 6:
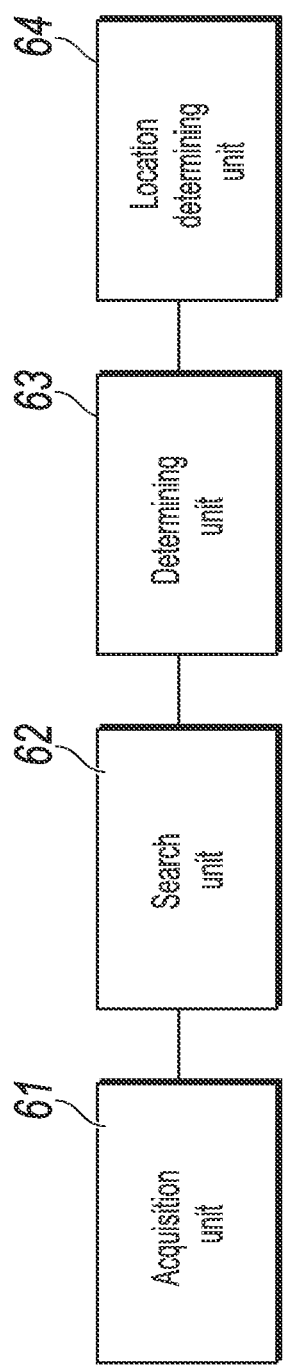
FIG. 6 is a schematic structural diagram illustrating a location positioning device, according to an implementation of the present application.

FIG. 6 is a schematic structural diagram illustrating a location positioning device, according to an implementation of the present application. The location positioning device includes an acquisition unit 61, a search unit 62, a determining unit 63, and a location determining unit 64.

The acquisition unit 61 obtains feature information of a Wi-Fi signal detected by user equipment, where the feature information includes identification information of the Wi-Fi signal.

The search unit 62 searches a database for identification information of a target object corresponding to the identification information of the Wi-Fi signal, where the database includes a mapping relationship between identification information of a Wi-Fi signal and identification information of a target object covered by the Wi-Fi signal.

The determining unit 63 determines an eigenvalue of the target object corresponding to the identification information, where the eigenvalue is used to represent a location relationship between the user equipment and the target object.

The location determining unit 64 determines, based on the eigenvalue of the target object, whether a location of the user equipment is consistent with a location of the target object.

The determining unit 63 determines an eigenvalue of the target object corresponding to the identification information, including: determining a first signal strength of the Wi-Fi signal detected by the user equipment; searching the database for a second signal strength of the Wi-Fi signal that has the mapping relationship with the identification information of the target object, where the database includes a mapping relationship between identification information of a target object, identification information of a Wi-Fi signal that covers the target object, and a signal strength of the Wi-Fi signal; and determining the eigenvalue of the target object based on the first signal strength of the Wi-Fi signal and the second signal strength of the Wi-Fi signal.

The search unit 62 determines the database by using the following method, including: obtaining feature information of the Wi-Fi signal that covers the target object, where the feature information of the Wi-Fi signal is included in a service request sent by a user, the feature information of the Wi-Fi signal includes the identification information of the Wi-Fi signal and the signal strength of the Wi-Fi signal, and the service request includes the identification information of the target object; and establishing the mapping relationship between identification information of a target object, identification information of a Wi-Fi signal that covers the target object, and a signal strength of the Wi-Fi signal, and storing the mapping relationship in the database.

It is worthwhile to note that the positioning device provided in this implementation of the present application can be implemented by using hardware or software, which is not limited here.

The acquisition unit obtains the feature information of the Wi-Fi signal that can be detected by the user equipment, the search unit searches for the identification information of the target object covered by the Wi-Fi signal, and the determining unit determines the eigenvalue of the target object and determines the location of the user equipment based on the eigenvalue of the target object. Because coverage of the Wi-Fi signal is relatively small, the accuracy of the user equipment's location determined based on the Wi-Fi signal is relatively high.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product according to the implementations of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions can be stored in a computer readable memory that can instruct the computer or any other programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

In typical configuration, the computing device includes one or more processors (CPUs), an input/output interface, a network interface, and a memory.

The memory can include a form of a volatile memory, a random access memory (RAM) and/or a non-volatile memory, etc., in a computer readable medium, such as a read-only memory (ROM) or a flash memory (flash RAM). The memory is an example of the computer readable medium.

The computer readable medium includes volatile and non-volatile, removable and non-removable media, and can store information by using any method or technology. The information can be a computer readable instruction, a data structure, a program module, or other data. The examples of computer storage medium include but are not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. As described in this specification, the computer readable medium does not include transitory media (transitory media), for example, a modulated data signal and a carrier.

It is worthwhile to note that terms "include", "contain", or their any other variant is intended to cover non-exclusive inclusion, so that a process, a method, an article, or a device that includes a series of elements not only includes these very elements, but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The previous descriptions are merely implementations of the present application, and are not intended to limit the present application. For a person skilled in the art, the present application can have various modifications and changes. Any modifications, equivalent substitutions, improvements, etc. made within the spirit and principle of the present application shall fall in the scope of the claims in the present application.

Figure 7:
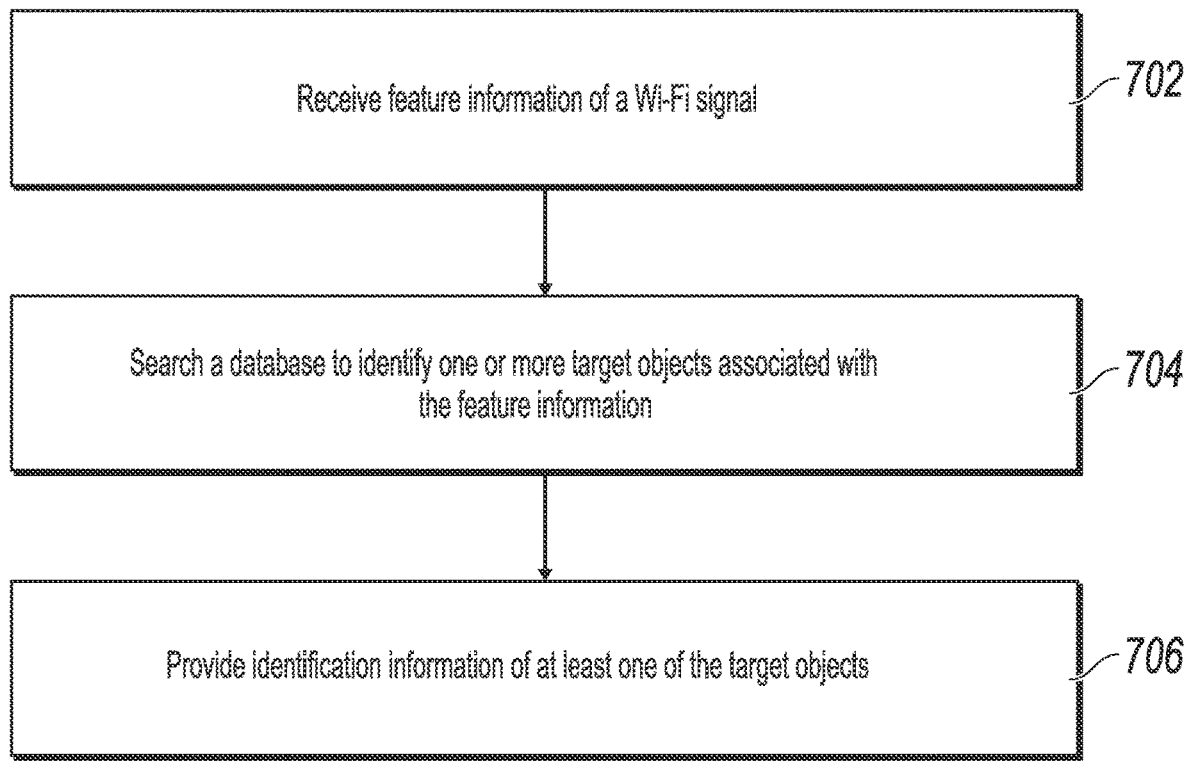
FIG. 7 is a flowchart illustrating an example of a computer-implemented method for positioning a location of a computing device according to an implementation of the present application.

FIG. 7 is a flowchart illustrating an example of a computer-implemented method 700 for positioning a location of a computing device, according to an implementation of the present application. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, feature information of a Wi-Fi signal is received. The Wi-Fi signal is a signal that is detected by the computing device. The computing device can be a movable device, for example, a user's smart phone (e.g., the user depicted in FIG. 3). The feature information can include an identification information of the Wi-Fi signal, a strength of the Wi-Fi signal as detected by the computing device, or any other information of the Wi-Fi signal as detected by the computing device. From 702, method 700 proceeds to 704.

At 704, a database is searched to determine one or more target objects associated with the received feature information of the Wi-Fi signal. The database maps (feature information of) a plurality of Wi-Fi signals to identification information of a plurality of target objects. For example, the database may map a first Wi-Fi signal to a restaurant, a second Wi-Fi signal to a museum, and a third Wi-Fi signal to a coffee shop and the restaurant. Using such mapping relationships, one or more target objects associated with the Wi-Fi signal, whose feature information was received at 702, are identified. From 704, method 700 proceeds to 706.

At 706, identification information of at least one of the one or more target objects is provided, for example, to be displayed on the computing device. The method 700 can be performed by a server that is in communication with the computing device and provides the identification information of the at least one target object to the computing device.

In some implementations, information of all of the one or more target objects that were identified at 704 are provided to the computing device. In some implementations, at least one target object is selected from the identified one or more target objects.

A target object may be selected based on the Wi-Fi signal strength that is mapped to the target object in the database. In some examples, only target objects that are mapped to signal strength greater than a threshold value are selected to be provided to the computing device. For example, both a first target object and a second target object may be identified (704) as being mapped to feature information of a Wi-Fi signal detected by a user computing device (which is received at 702). On the database, the first target object may be associated with −20 dB signal strength and the second target object may be associated with −50 dB signal strength for the detected Wi-Fi signal. In case that the threshold signal strength value is −40 dB, only the first target object (that is associated with a signal strength greater than −40 dB) may be provided to the computing device.

A target object may be selected from the identified one or more target objects (704) based on an analysis that determines the proximity of the target object to the location of the computing device. Such proximity can be determined based on an eigenvalue that was described above.

An eigenvalue of a target object can be determined as a function of a difference of a first Wi-Fi signal strength that was detected by the user computing device and a second Wi-Fi signal strength that is mapped to the target object (for the same Wi-Fi signal) in the database. The lower a difference between the first Wi-Fi signal strength and the second Wi-Fi signal strength is, the closer the computing device may be to the target object. In some examples, only the target objects that have an eigenvalue lower than a threshold value are selected and provided to the computing device.

An eigenvalue of a target object can be calculated as an inverse of a function of the difference between the first signal strength received from the computing device and the second signal strength mapped to the target object, and only target objects that have eigenvalues within a predetermined range may be selected to be provided to the computing device. For example, an eigenvalue can be calculated by $$\lambda = \frac{1}{|s_2 - s_1| + a} + b,$$

wherein $\lambda$ is the eigenvalue of the target object, $s_1$ is the first signal strength of the Wi-Fi signal, $s_2$ is the second signal strength of the Wi-Fi signal, and a and b are preset parameters. The predetermined range can be any value greater than a preset minimum value or lower than a preset maximum value. For example, in case of a=1 and b=0, the predetermined range may be [0.5, 1] or values greater than 0.6.

Depending on the method that is used to calculate the eigenvalue, a predetermined number of target objects that have the highest or the lowest eigenvalues may be determined and provided to the computing device. For example, in FIG. 3, the highest eigenvalue corresponds to the second target objects, following by the eigenvalues of the third and the first target objects. If the predetermined number is one, only the information of the second target object is provided to the user. If the predetermined number is two, the information of the second and the third target objects are provided to the user.

In some implementations, the database is searched (704) in response to determining that the signal strength of the Wi-Fi signal detected by the computing device is stronger than a threshold signal strength value. For example, if the signal strength is too weak, the signal may be ignored and be considered as an unreliable source of determining the target objects within a close vicinity of the computing device.

In some implementations, feature information of more than one Wi-Fi signal may be received from the computing device (702) and the one or more target objects are identified based on feature information of some or all of the received Wi-Fi signals. For example, the feature information may include identification information and signal strength of a first and a second signal, and the database may be searched in response to determining that at least one of the first and the second signal strengths is stronger than a threshold signal strength value. In some examples, the database may be searched only for the target objects that are mapped to Wi-Fi signals that have respective signal strength stronger than the threshold value. For instance, in the example above, if only the signal strength of the first signal is stronger than the threshold value, the database may be searched only for the first signal and ignore searching to identify the target objects associated with the second signal.

In response to providing the identification information of the at least one target object (706), a service request that includes an identification of a selected target object may be received from the computing device. For example, in response to providing a list of restaurants (as identified target objects) to be displayed on the computing device, a user may select one of the restaurants on the list, which can be received as a service request. In response to receiving a service request, detailed information about the target object may be provided to the computing device. For example, in response to receiving the selected restaurant (as the service request), a menu and/or price of the foods offered at the selected restaurant may be provided to the computing device.

The database can be updated by using the information of the received service requests. A service request can have information about a Wi-Fi signal. Such information can be used to update the information that is associated with the selected target object on the database. The Wi-Fi signal can be associated with a Wi-Fi network to which the computing device is connected, or can be associated with a Wi-Fi signal with the strongest strength among the Wi-Fi signals that are currently detected by the computing device. For example, the computing device may get connected to a Wi-Fi network that is offered at a restaurant or a Wi-Fi network that covers the restaurant. Upon receiving such information, the identification information and/or signal strength of the Wi-Fi signal that is mapped to the selected target object (e.g., the restaurant) can be updated.

Conventional techniques use satellite information such as global positioning system (GPS) to determine a current geographical location of a user's computing device and suggest resources (also referred to as "target objects" herein) located in a vicinity of the user. These techniques use the location information of target objects (e.g., information of shops, businesses, real estates saved in a database) to match them with the user's current location. The problem with this method is that GPS information can be imprecise and may provide a wide area that indicates an approximate location of the user rather than a precise location (or a small vicinity about) the user. For example, in areas with high-rise buildings, the accuracy of the GPS information can diminish and provide an area that covers multiple streets and cross sections where the user is possibly located rather than an accurate location of the user. Such inaccuracy can affect the target objects that are suggested to the user as the target objects within the vicinity of the user.

Implementations of the present application provide techniques to detect one or more target objects (e.g., shops, restaurants, etc.) in a close vicinity of a user. The implementations use information of at least one Wi-Fi signal that is detected by the user device to determine a vicinity or location of the user. Information of the Wi-Fi signal is searched in a database that maps information of a plurality of Wi-Fi signals to a set of target objects. Upon detecting that the Wi-Fi signal is mapped to one or more target objects, at least one of the one or more target objects is provided to the user (e.g., displayed on the computing device) as a suggested target object in the close vicinity of the user. Accordingly, the implementations improve the accuracy in detecting the location of a user, and provide more precise information about the target objects located in a close vicinity of the user as compared to the technologies that are solely based on satellite information.

In addition, the implementations update the database to suggest up-to-date target objects to the users and to improve the accuracy of positioning the user location. Once a list of target objects is suggested to the user, the user may select one of the target objects on the user's computing device. The computing device submits a service request that includes information of the selected target object, identification information of a Wi-Fi signal, and/or signal strength of the Wi-Fi signal. This Wi-Fi signal can be a Wi-Fi signal to which the computing device has correctly connected, or can be a Wi-Fi signal that has the highest strength as detected by the computing device. The database can be updated by using the information in the service request to map the selected target object to the identification information of the Wi-Fi signal and/or to the signal strength of the Wi-Fi signal.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:
   receiving, by the one or more processors and from a computing device, feature information of a Wi-Fi signal that is detected by the computing device, the feature information including identification information of the Wi-Fi signal;
   searching, by the one or more processors, a database to identify one or more target objects associated with the feature information of the Wi-Fi signal, the database mapping feature information of a plurality of Wi-Fi signals to identification information of a plurality of target objects, wherein the feature information includes a first signal strength that indicates a strength of the Wi-Fi signal as detected by the computing device;

determining one or more second signal strengths that are mapped, in the database, to the one or more target objects, the one or more second signal strengths being associated with the Wi-Fi signal;

determining one or more eigenvalues associated with the one or more target objects, an eigenvalue of a respective target object being calculated based on a difference between the first signal strength and a second signal strength that is mapped to the respective target object; and selecting at least one target object of the one or more target objects, wherein each target object in the at least one target object is selected based on a respective eigenvalue associated with the target object; and providing, by the one or more processor, identification information of the at least one target object to be displayed on the computing device.

2. The method of claim 1, wherein each target object in the at least one target object is selected in response to determining that the respective eigenvalue associated with the target object is less than a predetermined threshold value.

3. The method of claim 1, wherein the eigenvalue of the respective target object is determined as an inverse of a function of the difference between the first and the second signal strength associated with the respective target object, and wherein each target object in the at least one target object is selected in response to determining that a respective eigenvalue associated with the target object is greater than a threshold value.

4. The method of claim 1, wherein the feature information includes a first signal strength that indicates a strength value of the Wi-Fi signal as detected by the computing device, and the method further comprises:

determining one or more second signal strengths that are mapped, in the database, to the one or more target objects, the one or more second signal strengths being associated with the Wi-Fi signal, and selecting the at least one target object, wherein each target object in the at least one target object is selected in response to determining that a respective second signal strength associated with the target object is greater than a threshold value.

5. The method of claim 1, wherein the feature information includes a signal strength that indicates a strength value of the Wi-Fi signal as detected by the computing device, and wherein the database is searched in response to determining that the signal strength is greater than a threshold value.

6. The method of claim 1, wherein the feature information is first feature information and the Wi-Fi signal is a first Wi-Fi signal, and the method further comprises:

receiving second feature information of a second Wi-Fi signal that is detected by the computing device, wherein the first feature information includes a first signal strength that indicates a first strength of the first Wi-Fi signal as detected by the computing device, and the second feature information includes a second signal strength that indicates a second strength of the second Wi-Fi signal as detected by the computing device.

7. The method of claim 6, wherein the database is searched in response to determining that at least one of the first and the second signal strengths is greater than a threshold value.

8. The method of claim 7, wherein the database is searched to identify one or more target objects that are associated with the feature information associated with the at least one of the first and the second signal strengths that is greater than the threshold value.

9. The method of claim 1, further comprising in response to providing the identification information of the at least one target object, receiving a service request from the computing device, the service request including an identification of a selected target object that is selected from the at least one target object.

10. The method of claim 9, wherein the Wi-Fi signal is a first Wi-Fi signal and the service request includes identification information and a signal strength of a second Wi-Fi signal, the method further comprising updating the database to map the selected target object with the identification information and the signal strength of the second Wi-Fi signal.

11. A non-transitory, computer-readable medium storing one or more instructions executable by a computer system to perform operations comprising:

receiving, from a computing device, feature information of a Wi-Fi signal that is detected by the computing device, the feature information including identification information of the Wi-Fi signal;

searching a database to identify one or more target objects associated with the feature information of the Wi-Fi signal, the database mapping feature information of a plurality of Wi-Fi signals to identification information of a plurality of target objects, wherein the feature information includes a first signal strength that indicates a strength of the Wi-Fi signal as detected by the computing device;

determining one or more second signal strengths that are mapped, in the database, to the one or more target objects, the one or more second signal strengths being associated with the Wi-Fi signal;

determining one or more eigenvalues associated with the one or more target objects, an eigenvalue of a respective target object being calculated based on a difference between the first signal strength and a second signal strength that is mapped to the respective target object; and selecting at least one target object of the one or more target objects, wherein each target object in the at least one target object is selected based on a respective eigenvalue associated with the target object; and providing identification information of the at least one target object to be displayed on the computing device.

12. The non-transitory, computer-readable medium of claim 11, wherein each target object in the at least one target object is selected in response to determining that the respective eigenvalue associated with the target object is less than a predetermined threshold value.

13. The non-transitory, computer-readable medium of claim 11, wherein the eigenvalue of the respective target object is determined as an inverse of a function of the difference between the first and the second signal strength associated with the respective target object, and wherein each target object in the at least one target object is selected in response to determining that a respective eigenvalue associated with the target object is greater than a threshold value.

14. The non-transitory, computer-readable medium of claim 11, wherein the feature information includes a first signal strength that indicates a strength value of the Wi-Fi signal as detected by the computing device, and the operations further comprise:
  determining one or more second signal strengths that are mapped, in the database, to the one or more target objects, the one or more second signal strengths being associated with the Wi-Fi signal, and
  selecting the at least one target object, wherein each target object in the at least one target object is selected in response to determining that a respective second signal strength associated with the target object is greater than a threshold value.

15. The non-transitory, computer-readable medium of claim 11, wherein the feature information includes a signal strength that indicates a strength value of the Wi-Fi signal as detected by the computing device, and wherein the database is searched in response to determining that the signal strength is greater than a threshold value.

16. The non-transitory, computer-readable medium of claim 11, wherein the feature information is first feature information and the Wi-Fi signal is a first Wi-Fi signal, and the operations further comprise:
  receiving second feature information of a second Wi-Fi signal that is detected by the computing device, wherein the first feature information includes a first signal strength that indicates a first strength of the first Wi-Fi signal as detected by the computing device, and the second feature information includes a second signal strength that indicates a second strength of the second Wi-Fi signal as detected by the computing device.

17. The non-transitory, computer-readable medium of claim 16, wherein the database is searched in response to determining that at least one of the first and the second signal strengths is greater than a threshold value.

18. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    receiving, from a computing device, feature information of a Wi-Fi signal that is detected by the computing device, the feature information including identification information of the Wi-Fi signal;
    searching a database to identify one or more target objects associated with the feature information of the Wi-Fi signal, the database mapping feature information of a plurality of Wi-Fi signals to identification information of a plurality of target objects, wherein the feature information includes a first signal strength that indicates a strength of the Wi-Fi signal as detected by the computing device;
    determining one or more second signal strengths that are mapped, in the database, to the one or more target objects, the one or more second signal strengths being associated with the Wi-Fi signal;
    determining one or more eigenvalues associated with the one or more target objects, an eigenvalue of a respective target object being calculated based on a difference between the first signal strength and a second signal strength that is mapped to the respective target object; and
    selecting at least one target object of the one or more target objects, wherein each target object in the at least one target object is selected based on a respective eigenvalue associated with the target object; and
    providing identification information of the at least one target object to be displayed on the computing device.

19. A computer-implemented method executed by one or more processors, the method comprising:
  receiving, by the one or more processors and from a computing device, feature information of a Wi-Fi signal that is detected by the computing device, the feature information including identification information of the Wi-Fi signal;
  searching, by the one or more processors, a database to identify one or more target objects associated with the feature information of the Wi-Fi signal, the database mapping feature information of a plurality of Wi-Fi signals to identification information of a plurality of target objects;
  providing, by the one or more processor, identification information of at least one target object of the one or more target objects to be displayed on the computing device; and
  in response to providing the identification information of the at least one target object, receiving a service request from the computing device, the service request including an identification of a selected target object that is selected from the at least one target object, wherein the Wi-Fi signal is a first Wi-Fi signal and the service request includes identification information and a signal strength of a second Wi-Fi signal, and wherein the database is updated to map the selected target object with the identification information and the signal strength of the second Wi-Fi signal.

20. A non-transitory, computer-readable medium storing one or more instructions executable by a computer system to perform operations comprising:
  receiving, from a computing device, feature information of a Wi-Fi signal that is detected by the computing device, the feature information including identification information of the Wi-Fi signal;
  searching a database to identify one or more target objects associated with the feature information of the Wi-Fi signal, the database mapping feature information of a plurality of Wi-Fi signals to identification information of a plurality of target objects;
  providing identification information of at least one target object of the one or more target objects to be displayed on the computing device; and
  in response to providing the identification information of the at least one target object, receiving a service request from the computing device, the service request including an identification of a selected target object that is selected from the at least one target object, wherein the Wi-Fi signal is a first Wi-Fi signal and the service request includes identification information and a signal strength of a second Wi-Fi signal, and wherein the database is updated to map the selected target object with the identification information and the signal strength of the second Wi-Fi signal.

21. A computer-implemented system, comprising:
  one or more computers; and
  one or more computer memory devices interoperably coupled with the one or more computers and having tangible, non-transitory, machine-readable media storing one or more instructions that, when executed by the one or more computers, perform one or more operations comprising:

receiving, from a computing device, feature information of a Wi-Fi signal that is detected by the computing device, the feature information including identification information of the Wi-Fi signal;

searching a database to identify one or more target objects associated with the feature information of the Wi-Fi signal, the database mapping feature information of a plurality of Wi-Fi signals to identification information of a plurality of target objects;

providing identification information of at least one target object of the one or more target objects to be displayed on the computing device; and in response to providing the identification information of the at least one target object, receiving a service request from the computing device, the service request including an identification of a selected target object that is selected from the at least one target object, wherein the Wi-Fi signal is a first Wi-Fi signal and the service request includes identification information and a signal strength of a second Wi-Fi signal, and wherein the database is updated to map the selected target object with the identification information and the signal strength of the second Wi-Fi signal.

* * * * *